United States Patent
Walsh et al.

(10) Patent No.: US 7,782,866 B1
(45) Date of Patent: Aug. 24, 2010

(54) VIRTUAL PEER IN A PEER-TO-PEER NETWORK

(75) Inventors: Richard J. Walsh, Raleigh, NC (US);
Alfredo C. Issa, Apex, NC (US);
Christopher M. Amidon, Apex, NC (US); James Evans, Apex, NC (US);
Jens Hillen, Peterborough, NH (US)

(73) Assignee: Qurio Holdings, Inc., Raleigh, NC (US)

( * ) Notice: Subject to any disclaimer, the term of this patent is extended or adjusted under 35 U.S.C. 154(b) by 477 days.

(21) Appl. No.: 11/536,868

(22) Filed: Sep. 29, 2006

(51) Int. Cl.
*H04L 12/28* (2006.01)
*G06F 15/173* (2006.01)
*G06F 17/00* (2006.01)

(52) U.S. Cl. .................. 370/395.31; 370/401; 709/238; 707/622

(58) Field of Classification Search ................... 370/399
See application file for complete search history.

(56) References Cited

U.S. PATENT DOCUMENTS

| | | |
|---|---|---|
| 5,220,657 A | 6/1993 | Bly et al. |
| 5,517,617 A | 5/1996 | Sathaye et al. |
| 5,629,980 A | 5/1997 | Stefik et al. |
| 5,754,939 A | 5/1998 | Herz et al. |
| 5,884,035 A | 3/1999 | Butman et al. |
| 6,073,138 A | 6/2000 | de l'Etraz et al. |
| 6,088,702 A | 7/2000 | Plantz et al. |
| 6,138,159 A | 10/2000 | Phaal |
| 6,151,624 A | 11/2000 | Teare et al. |
| 6,167,441 A | 12/2000 | Himmel |
| 6,182,808 B1 | 2/2001 | Walton et al. |
| 6,260,069 B1 | 7/2001 | Anglin |
| 6,275,819 B1 | 8/2001 | Carter |
| 6,311,194 B1 | 10/2001 | Sheth et al. |
| 6,314,409 B2 | 11/2001 | Schneck et al. |
| 6,327,590 B1 | 12/2001 | Chidlovskii et al. |

(Continued)

FOREIGN PATENT DOCUMENTS

EP    1 338 966 A3    8/2003

(Continued)

OTHER PUBLICATIONS

Dijkstra's algorithm, http://en.wikipedia.org/wiki/Dijkstra's_algorithm.

(Continued)

*Primary Examiner*—Chirag G Shah
*Assistant Examiner*—Nima Mahmoudzadeh
(74) *Attorney, Agent, or Firm*—Withrow & Terranova, PLLC

(57) ABSTRACT

The present invention relates to a virtual peer for a peer-to-peer (P2P) network. In general, the virtual peer is a logical construct enabling a number of virtual peer members to appear as a single peer node in the P2P network. In operation, a sponsoring agent creates and registers a virtual peer including a number of virtual peer members with the P2P network. Once registered, the virtual peer appears as a new peer node in the P2P network, wherein the sponsoring agent operates as the communication end-point for the virtual peer in the P2P network. Thereafter, when the sponsoring agent receives an incoming message on behalf of the virtual peer, the sponsoring agent sends the incoming message to one or more of the virtual peer members.

30 Claims, 21 Drawing Sheets

U.S. PATENT DOCUMENTS

| | | |
|---|---|---|
| 6,338,086 B1 | 1/2002 | Curtis et al. |
| 6,349,301 B1 | 2/2002 | Mitchell et al. |
| 6,349,336 B1 | 2/2002 | Sit et al. |
| 6,356,879 B2 | 3/2002 | Aggarwal et al. |
| 6,389,409 B1 | 5/2002 | Horovitz et al. |
| 6,389,541 B1 | 5/2002 | Patterson |
| 6,421,439 B1 | 7/2002 | Liffick |
| 6,442,693 B1 | 8/2002 | Sandgren et al. |
| 6,453,294 B1 | 9/2002 | Dutta et al. |
| 6,457,010 B1 | 9/2002 | Eldering et al. |
| 6,463,433 B1 | 10/2002 | Baclawski |
| 6,480,885 B1 | 11/2002 | Olivier |
| 6,498,795 B1 | 12/2002 | Zhang et al. |
| 6,519,629 B2 | 2/2003 | Harvey et al. |
| 6,525,747 B1 | 2/2003 | Bezos |
| 6,545,682 B1 | 4/2003 | Ventralla et al. |
| 6,553,367 B2 | 4/2003 | Horovitz et al. |
| 6,560,578 B2 | 5/2003 | Eldering |
| 6,567,122 B1 | 5/2003 | Anderson et al. |
| 6,580,811 B2 | 6/2003 | Maurer et al. |
| 6,581,072 B1 | 6/2003 | Mathur et al. |
| 6,594,693 B1 | 7/2003 | Borwankar |
| 6,610,105 B1 | 8/2003 | Martin, Jr. et al. |
| 6,629,100 B2 | 9/2003 | Morris et al. |
| 6,630,944 B1 | 10/2003 | Kakuta et al. |
| 6,631,098 B2 | 10/2003 | Chang et al. |
| 6,651,086 B1 | 11/2003 | Manber et al. |
| 6,687,732 B1 | 2/2004 | Bector et al. |
| 6,701,362 B1 | 3/2004 | Subramonian et al. |
| 6,725,259 B1 | 4/2004 | Bharar |
| 6,738,764 B2 | 5/2004 | Mao et al. |
| 6,748,420 B1 | 6/2004 | Quatrano et al. |
| 6,757,517 B2 | 6/2004 | Chang |
| 6,772,160 B2 | 8/2004 | Cho et al. |
| 6,785,704 B1 | 8/2004 | McCanne |
| 6,795,972 B2 | 9/2004 | Rovira |
| 6,816,906 B1 | 11/2004 | Icken et al. |
| 6,832,245 B1 | 12/2004 | Isaacs et al. |
| 6,854,069 B2 * | 2/2005 | Kampe et al. ................. 714/4 |
| 6,910,186 B2 | 6/2005 | Kim |
| 6,917,944 B1 | 7/2005 | Prasad et al. |
| 6,917,965 B2 | 7/2005 | Gupta et al. |
| 6,957,193 B2 | 10/2005 | Stefik et al. |
| 6,959,290 B2 | 10/2005 | Stefik et al. |
| 6,970,444 B2 | 11/2005 | Chwieseni et al. |
| 6,970,840 B1 | 11/2005 | Yu et al. |
| 6,988,096 B2 | 1/2006 | Gupta et al. |
| 6,988,127 B2 | 1/2006 | Matsuda et al. |
| 6,993,564 B2 | 1/2006 | Whitten, II |
| 7,006,098 B2 | 2/2006 | Bickmore et al. |
| 7,016,307 B2 | 3/2006 | Vasudev et al. |
| 7,024,391 B2 | 4/2006 | Burich |
| 7,034,678 B2 | 4/2006 | Burkley et al. |
| 7,036,082 B2 | 4/2006 | Dalrymple et al. |
| 7,043,644 B2 | 5/2006 | DeBruine |
| 7,047,202 B2 | 5/2006 | Jaipuria et al. |
| 7,047,406 B2 | 5/2006 | Schleicher et al. |
| 7,051,003 B1 | 5/2006 | Kobata et al. |
| 7,054,900 B1 | 5/2006 | Goldston |
| 7,058,606 B2 | 6/2006 | Stefik et al. |
| 7,058,897 B2 | 6/2006 | Matsuda |
| 7,069,308 B2 | 6/2006 | Abrams |
| 7,072,982 B2 | 7/2006 | Teodosiu et al. |
| 7,103,634 B1 | 9/2006 | Ullmann et al. |
| 7,107,317 B2 | 9/2006 | Demsky et al. |
| 7,107,549 B2 | 9/2006 | Deaton et al. |
| 7,120,681 B2 | 10/2006 | Frelechoux et al. |
| 7,150,030 B1 | 12/2006 | Eldering et al. |
| 7,302,429 B1 | 11/2007 | Wanker |
| 7,370,015 B2 | 5/2008 | Gvily |
| 7,401,115 B1 | 7/2008 | Arsenault |
| 2001/0007099 A1 | 7/2001 | Rau et al. |
| 2001/0042043 A1 | 11/2001 | Shear et al. |
| 2002/0023143 A1 | 2/2002 | Stephenson et al. |
| 2002/0032634 A1 | 3/2002 | Abrams et al. |
| 2002/0052885 A1 | 5/2002 | Levy |
| 2002/0057284 A1 | 5/2002 | Dalby et al. |
| 2002/0077985 A1 | 6/2002 | Kobata et al. |
| 2002/0078206 A1 | 6/2002 | Boies et al. |
| 2002/0091556 A1 | 7/2002 | Fiala et al. |
| 2002/0091667 A1 | 7/2002 | Jaipuria et al. |
| 2002/0091975 A1 | 7/2002 | Redlich et al. |
| 2002/0103998 A1 | 8/2002 | DeBruine |
| 2002/0116466 A1 | 8/2002 | Trevithick et al. |
| 2002/0124053 A1 | 9/2002 | Adams et al. |
| 2002/0138744 A1 | 9/2002 | Schleicher et al. |
| 2002/0152322 A1 | 10/2002 | Hay |
| 2002/0156875 A1 * | 10/2002 | Pabla ........................ 709/220 |
| 2002/0156893 A1 | 10/2002 | Pouyoul et al. |
| 2002/0156917 A1 * | 10/2002 | Nye ........................... 709/238 |
| 2002/0169737 A1 | 11/2002 | Armstrong et al. |
| 2002/0178164 A1 | 11/2002 | Wisniewski |
| 2003/0002521 A1 | 1/2003 | Traversat et al. |
| 2003/0009423 A1 | 1/2003 | Wang et al. |
| 2003/0014482 A1 | 1/2003 | Toyota et al. |
| 2003/0018582 A1 | 1/2003 | Yaacovi |
| 2003/0018968 A1 | 1/2003 | Avnet |
| 2003/0028596 A1 | 2/2003 | Toyota et al. |
| 2003/0028639 A1 | 2/2003 | Yamamoto et al. |
| 2003/0046587 A1 | 3/2003 | Bheemarasetti et al. |
| 2003/0050976 A1 | 3/2003 | Block et al. |
| 2003/0050977 A1 | 3/2003 | Puthenkulam et al. |
| 2003/0061282 A1 | 3/2003 | Ebata et al. |
| 2003/0079120 A1 | 4/2003 | Hearn et al. |
| 2003/0084162 A1 | 5/2003 | Johnson et al. |
| 2003/0093520 A1 | 5/2003 | Beesley |
| 2003/0105812 A1 | 6/2003 | Flowers, Jr. et al. |
| 2003/0110056 A1 | 6/2003 | Berghofer et al. |
| 2003/0112823 A1 | 6/2003 | Collins et al. |
| 2003/0120662 A1 | 6/2003 | Vishik |
| 2003/0120680 A1 | 6/2003 | Agrawal et al. |
| 2003/0135576 A1 | 7/2003 | Bodin |
| 2003/0154306 A1 | 8/2003 | Perry |
| 2003/0163597 A1 | 8/2003 | Hellman et al. |
| 2003/0167324 A1 | 9/2003 | Farnham et al. |
| 2003/0171941 A1 | 9/2003 | Kraenzel et al. |
| 2003/0172034 A1 | 9/2003 | Schneck et al. |
| 2003/0179228 A1 | 9/2003 | Schreiber et al. |
| 2003/0191814 A1 | 10/2003 | Tran |
| 2003/0195851 A1 | 10/2003 | Ong |
| 2003/0195924 A1 | 10/2003 | Franke et al. |
| 2003/0204605 A1 | 10/2003 | Hudson et al. |
| 2003/0220975 A1 | 11/2003 | Malik |
| 2003/0220980 A1 | 11/2003 | Crane |
| 2004/0015553 A1 | 1/2004 | Griffin et al. |
| 2004/0024720 A1 | 2/2004 | Fairweather |
| 2004/0024892 A1 | 2/2004 | Creswell et al. |
| 2004/0039913 A1 | 2/2004 | Kruse |
| 2004/0044727 A1 | 3/2004 | Abdelaziz et al. |
| 2004/0044774 A1 | 3/2004 | Mangalik et al. |
| 2004/0054723 A1 | 3/2004 | Dayal et al. |
| 2004/0064416 A1 | 4/2004 | Peled et al. |
| 2004/0064568 A1 | 4/2004 | Arora et al. |
| 2004/0064693 A1 | 4/2004 | Pabla et al. |
| 2004/0073659 A1 | 4/2004 | Rajsic et al. |
| 2004/0081105 A1 | 4/2004 | Shimazaki et al. |
| 2004/0088325 A1 | 5/2004 | Elder et al. |
| 2004/0103044 A1 | 5/2004 | Vandewater et al. |
| 2004/0122822 A1 | 6/2004 | Thompson et al. |
| 2004/0122855 A1 | 6/2004 | Ruvolo et al. |
| 2004/0122958 A1 | 6/2004 | Wardrop |
| 2004/0137882 A1 | 7/2004 | Forsyth |
| 2004/0139227 A1 | 7/2004 | Takeda |
| 2004/0148275 A1 | 7/2004 | Achlioptas |

| | | |
|---|---|---|
| 2004/0148434 A1 | 7/2004 | Matsubara et al. |
| 2004/0148503 A1 | 7/2004 | Sidman |
| 2004/0162871 A1 | 8/2004 | Pabla et al. |
| 2004/0179039 A1 | 9/2004 | Blattner et al. |
| 2004/0181487 A1 | 9/2004 | Hanson |
| 2004/0189701 A1 | 9/2004 | Badt, Jr. |
| 2004/0193680 A1 | 9/2004 | Gibbs et al. |
| 2004/0199867 A1 | 10/2004 | Brandenborg et al. |
| 2004/0205358 A1 | 10/2004 | Erickson |
| 2004/0210535 A1 | 10/2004 | Erickson |
| 2004/0215793 A1 | 10/2004 | Ryan et al. |
| 2004/0220893 A1 | 11/2004 | Spivack et al. |
| 2004/0237045 A1 | 11/2004 | Meltzer |
| 2004/0249768 A1 | 12/2004 | Kontio et al. |
| 2004/0267625 A1 | 12/2004 | Feng et al. |
| 2005/0013298 A1* | 1/2005 | Srisuresh et al. ............ 370/392 |
| 2005/0015357 A1 | 1/2005 | Shahidi |
| 2005/0021096 A1 | 1/2005 | Mower |
| 2005/0031096 A1 | 2/2005 | Postrel |
| 2005/0034107 A1 | 2/2005 | Kendall et al. |
| 2005/0044361 A1 | 2/2005 | Chang et al. |
| 2005/0044411 A1 | 2/2005 | Somin et al. |
| 2005/0060746 A1 | 3/2005 | Kim |
| 2005/0091289 A1 | 4/2005 | Shappell et al. |
| 2005/0091316 A1 | 4/2005 | Ponce et al. |
| 2005/0094313 A1 | 5/2005 | Kim |
| 2005/0097170 A1 | 5/2005 | Zhu et al. |
| 2005/0114783 A1 | 5/2005 | Szeto |
| 2005/0137015 A1 | 6/2005 | Rogers et al. |
| 2005/0138430 A1 | 6/2005 | Landsman |
| 2005/0149621 A1 | 7/2005 | Kirkland et al. |
| 2005/0154701 A1 | 7/2005 | Parunak et al. |
| 2005/0159970 A1 | 7/2005 | Buyukkokten et al. |
| 2005/0159998 A1 | 7/2005 | Buyukkokten et al. |
| 2005/0163135 A1 | 7/2005 | Hopkins |
| 2005/0165726 A1 | 7/2005 | Kawell, Jr. et al. |
| 2005/0171799 A1 | 8/2005 | Hull et al. |
| 2005/0171832 A1 | 8/2005 | Hull et al. |
| 2005/0171954 A1 | 8/2005 | Hull et al. |
| 2005/0171955 A1 | 8/2005 | Hull et al. |
| 2005/0172001 A1 | 8/2005 | Zaner et al. |
| 2005/0172116 A1 | 8/2005 | Burch et al. |
| 2005/0177385 A1 | 8/2005 | Hull et al. |
| 2005/0177614 A1 | 8/2005 | Bourne |
| 2005/0197846 A1 | 9/2005 | Pezaris et al. |
| 2005/0198031 A1 | 9/2005 | Pezaris et al. |
| 2005/0198131 A1 | 9/2005 | Appelman et al. |
| 2005/0198172 A1 | 9/2005 | Appelman et al. |
| 2005/0198290 A1 | 9/2005 | Berkey et al. |
| 2005/0198305 A1 | 9/2005 | Pezaris et al. |
| 2005/0201290 A1 | 9/2005 | Vasudev et al. |
| 2005/0203801 A1 | 9/2005 | Morgenstern et al. |
| 2005/0204038 A1 | 9/2005 | Medvinsky et al. |
| 2005/0210104 A1 | 9/2005 | Torvinen |
| 2005/0210409 A1 | 9/2005 | Jou |
| 2005/0215660 A1 | 9/2005 | Tomikawa et al. |
| 2005/0216300 A1 | 9/2005 | Appelman et al. |
| 2005/0216550 A1 | 9/2005 | Paseman et al. |
| 2005/0229243 A1 | 10/2005 | Svendsen et al. |
| 2005/0232423 A1 | 10/2005 | Horvitz et al. |
| 2005/0234864 A1 | 10/2005 | Shapiro |
| 2005/0235062 A1 | 10/2005 | Lunt et al. |
| 2005/0240773 A1 | 10/2005 | Hilbert et al. |
| 2005/0243736 A1 | 11/2005 | Faloutsos et al. |
| 2005/0246420 A1 | 11/2005 | Little, II |
| 2005/0251553 A1 | 11/2005 | Gottfried |
| 2005/0256866 A1 | 11/2005 | Lu et al. |
| 2005/0256909 A1 | 11/2005 | Aboulhosn et al. |
| 2005/0262162 A1 | 11/2005 | Levy |
| 2005/0262199 A1 | 11/2005 | Chen et al. |
| 2005/0262530 A1 | 11/2005 | Ruetschi et al. |
| 2005/0264647 A1 | 12/2005 | Rzeszewski et al. |
| 2005/0266835 A1 | 12/2005 | Agrawal et al. |
| 2005/0267766 A1 | 12/2005 | Galbreath et al. |
| 2005/0267940 A1 | 12/2005 | Galbreath et al. |
| 2005/0283497 A1 | 12/2005 | Nurminen et al. |
| 2005/0289648 A1 | 12/2005 | Grobman et al. |
| 2006/0004789 A1 | 1/2006 | Lunt et al. |
| 2006/0004892 A1 | 1/2006 | Lunt et al. |
| 2006/0010225 A1 | 1/2006 | Issa |
| 2006/0015588 A1 | 1/2006 | Achlioptas et al. |
| 2006/0015868 A1 | 1/2006 | Rechterman et al. |
| 2006/0020960 A1 | 1/2006 | Relan et al. |
| 2006/0021009 A1 | 1/2006 | Lunt |
| 2006/0026235 A1 | 2/2006 | Schwarz et al. |
| 2006/0031489 A1 | 2/2006 | Marcjan |
| 2006/0031770 A1 | 2/2006 | McMenamin |
| 2006/0035766 A1 | 2/2006 | Towley, III et al. |
| 2006/0036641 A1 | 2/2006 | Brydon et al. |
| 2006/0036766 A1 | 2/2006 | Baupin et al. |
| 2006/0047635 A1 | 3/2006 | Kraenzel et al. |
| 2006/0047839 A1 | 3/2006 | Tate et al. |
| 2006/0048059 A1 | 3/2006 | Etkin |
| 2006/0053380 A1 | 3/2006 | Spataro et al. |
| 2006/0064411 A1 | 3/2006 | Gross et al. |
| 2006/0064431 A1 | 3/2006 | Kishore et al. |
| 2006/0085248 A1 | 4/2006 | Arnett et al. |
| 2006/0089913 A1 | 4/2006 | Jaipuria et al. |
| 2006/0090137 A1 | 4/2006 | Cheng et al. |
| 2006/0095514 A1 | 5/2006 | Wang et al. |
| 2006/0095792 A1 | 5/2006 | Hurtado et al. |
| 2006/0095976 A1 | 5/2006 | Torres et al. |
| 2006/0107286 A1 | 5/2006 | Connor et al. |
| 2006/0111188 A1 | 5/2006 | Winkler |
| 2006/0117090 A1 | 6/2006 | Schellingerhout et al. |
| 2006/0117378 A1 | 6/2006 | Tam et al. |
| 2006/0121988 A1 | 6/2006 | Reville et al. |
| 2006/0123127 A1 | 6/2006 | Littlefield |
| 2006/0136419 A1 | 6/2006 | Brydon et al. |
| 2006/0136551 A1 | 6/2006 | Amidon et al. |
| 2006/0143068 A1 | 6/2006 | Calabria |
| 2006/0143084 A1 | 6/2006 | Donnelli et al. |
| 2006/0143183 A1 | 6/2006 | Goldberg et al. |
| 2006/0143236 A1 | 6/2006 | Wu |
| 2006/0146765 A1 | 7/2006 | Van De Sluis et al. |
| 2006/0155813 A1 | 7/2006 | Dietz et al. |
| 2006/0167804 A1 | 7/2006 | Aydar et al. |
| 2006/0167855 A1 | 7/2006 | Ishikawa et al. |
| 2006/0173838 A1 | 8/2006 | Garg et al. |
| 2006/0173957 A1 | 8/2006 | Robinson et al. |
| 2006/0173963 A1 | 8/2006 | Roseway et al. |
| 2006/0184997 A1 | 8/2006 | La Rotonda et al. |
| 2006/0190536 A1 | 8/2006 | Strong et al. |
| 2006/0195462 A1 | 8/2006 | Rogers et al. |
| 2006/0200434 A1 | 9/2006 | Flinn et al. |
| 2006/0200435 A1 | 9/2006 | Flinn et al. |
| 2006/0209727 A1 | 9/2006 | Jennings, III et al. |
| 2006/0218225 A1 | 9/2006 | Hee Voon et al. |
| 2006/0218577 A1 | 9/2006 | Goodman et al. |
| 2006/0235790 A1 | 10/2006 | Jung et al. |
| 2006/0259733 A1 | 11/2006 | Yamazaki et al. |
| 2006/0267940 A1 | 11/2006 | Groom et al. |

FOREIGN PATENT DOCUMENTS

| | | |
|---|---|---|
| EP | 1 473 650 A1 | 11/2004 |
| EP | 1 689 143 A1 | 8/2006 |
| WO | WO 2005/020129 A2 | 3/2005 |
| WO | 2005111760 A1 | 11/2005 |

OTHER PUBLICATIONS

Welcome to Facebook!, http://www.facebook.com/.
The Friend of a Fried (FOAF) Project, http://www.foaf-project.com.
Friendster—Home, http://www.friendster.com.
News—Gaim 1.5.0, http://www.gaim.sourceforge.net.

Huminity—Social Networking, http://www.huminity.com/english/software.html.
ICQ, http://www.icq.com/.
MySpace, http://www.myspace.com.
pidgin, http://pidgin.im/.
Architecture of Windows Media Rights Manager, www.microsoft.com/windows/windowsmedia/howto/articles/ drmarchitecture.aspx.
FOAF Vocabulary Specification, http://xmlns.com/foaf/0.1/.
Deborah L. McGuinness et al., editors; "OWL Web Ontology Language—Overview", copyright 2004 World Wide Web Consortium (W3C), published Feb. 10, 2004, http://www.w3.org/TR/2004/REC-owl-features-20040210/, 19 pages.
Pretschner, Alexander et al., "Ontology Based Personalized Search," Proceedings of the 11th IEEE International Conference on Tools with Artificial Intelligence, p. 391, Nov. 8-10, 1999.
Warren Sack, "Discourse Diagrams: Interface Design for Very Large-Scale Conversations," System Sciences, Proceedings of the 33rd Annual Hawaii International Conference, 2000.
Marc A. Smith and Andrew T. Fiore, "Visualization Components for Persistent Conversations," Sep. 2000.
Srinivasan, T. et al., "OPSHNN: Ontology Based Personalized Searching Using Hierarchical Neural Networks Evidence Combination," The Sixth IEEE International Conference on Computer and Information Technology 2006, pp. 44-44, Sep. 2006.
Beverly Yang et al., "Designing a Super-Peer Network," 19th International Conference on Data Engineering (ICDE'03), 2003.
The Case for a Hybrid P2P Search Infrastructure, http://www.cs.berkeley.edu/~boonloo/research/pier/casehybrid_iptps.ppt.
No Author, "Avatars—Yahoo! Messenger," (website), obtained May 17, 2007, 2 pages, http://messenger.yahoo.com/avatars.php.
No Author, "Cyworld," (website), obtained May 17, 2007, 4 pages, http://us.cyworld.com/main/index.php.
No Author, "Download MyStrands," (website), obtained Oct. 10, 2007, 6 pages, http://www.mystrands.com/mystrands/whatis/faq.vm.
No Author, "Gravatar—Globally Recognized Avatars," (website), obtained May 17, 2007, 1 page, http://site.gravatar com/.
No Author, "Luskwood Creatures," (website), obtained May 17, 2007, 7 pages, http://www.luskwood.com/index.htm.
No Author, "Meez—Avatars for MySpace, Xanga and IM," (website), obtained May 17, 2007, 17 pages, http://mashable.com/2006/08/22/meez-avatars-for-myspace-xanga-and-im/.
No Author, "MySpace," (website), obtained May 31, 2007, 2 pages, http://www.myspace.com.
No Author, "Pandora Radio," (website), obtained May 31, 2007, 1 page, http://www.pandora.com.
Jason Parker, "An Easy Way to Share Digital Photos with Others," (article), Jun. 13, 2003, 1 page, ZDNet AnchorDesk Editorial Feature, http://reviews-zdnet.com.
No Author, "Personalise Skype—Invent Yourself," (website), obtained May 17, 2007, 1 page, http://skype.klonies.com/studio.php.
No Author, "Press Releases Comverse," (website), obtained May 17, 2007, 3 pages, http://www.comverse.com/press_releases.aspx?newsld=412.
Rana El Kaliouby et al., "FAIM: Integrating Automated Facial Affect Analysis in Instant Messaging," (article), 2004, pp. 244-246, in Proceedings of ACM International Conference on Intelligent User Interfaces (IUI).
No Author, "Rhapsody—Free access to millions of songs online," (website), obtained May 31, 2007, 3 pages, http://www.rhapsody.com/home.html.
No Author, "Youniversal Branding," (website), obtained May 17, 2007, 31 pages, http://www.trendwatching.com/trends/YOUNIVERSALBRANDING.htm.

* cited by examiner

```xml
<peer-information>
    <networks>
        <network>
            <name>gnutella</name>
            <superpeer>65.55.123.21</superpeer>
        </network>
        <network>
            <name>flashpoint</name>
            <id>khan</id>
        </network>
        <network>
            <name>internet</name>
            <id>64.233.167.99</id>
        </network>
    </networks>
    <device>
        <vendor>Nokia</vendor>
        <model>2160</model>
        <type>PDA</type>
        <screensize>800x600x24</screensize>
        <keyboard>yes</keyboard>
        <cpu>PPC</cpu>
        <memory>64MB</memory>
        <speakers>yes</speakers>
        <gps-location>N 35° 47.440' W 078° 39.597'</gps-location>
    </device>
</peer-information>
<contents>
    <content>
        <name>kirk.jpg</name>
        <location>/startrek/pictures</location>
        <size>192512</size>
        <created>January 1, 2006</created>
        <misc>
            <entry>
                <name>tags</name>
                <value>kirk, tribble, enterprise</value>
            </entry>
            <entry>
                <name>comment</name>
                <value>kirk standing so triumphantly</value>
            </entry>
        </misc>
    </content>
```

*FIG. 10A*

```
<content>
    <name>tribble.jpg</name>
    <location>/startrek/pictures</location>
    <size>231211</size>
    <created>January 5, 2006</created>
    <misc>
        <entry>
            <name>tags</name>
            <value>tribble, furry, animal</value>
        </entry>
        <entry>
            <name>comment</name>
            <value>my cute friends!</value>
        </entry>
    </misc>
</content>
</contents>
<user>
    <name>John Doe</name>
    <nick-name>doughboy</nick-name>
    <city>Raleigh</city>
    <state>NC</state>
    <hobbies>snowboarding, World Of Warcraft, writing music</hobbies>
    <school>University of North Carolina</school>
</user>
```

VIRTUAL PEER IN A PEER-TO-PEER NETWORK

FIELD OF THE INVENTION

The present invention relates to a peer-to-peer (P2P) network, and more particularly relates to a virtual peer for a P2P network.

BACKGROUND OF THE INVENTION

Peer-to-peer (P2P) networks for sharing digital content and resources have gained great popularity. However, due to the fact that each peer node in a P2P network is uniquely addressable, it is not currently possible to address more than one device with a single request in a manner that is transparent to the client. For example, if a particular user is the owner of multiple peer devices such as a personal computer, mobile telephone, and a Personal Video Recorder (PVR), there is currently no means to address all of the user's peer devices using a single request that is transparent to the client. Multi-casting may be used, but it is not transparent to the client. Thus, there is a need for a P2P network architecture that enables a client to address more than one device associated with the P2P network in a manner that is transparent to the client.

SUMMARY OF THE INVENTION

The present invention relates to a virtual peer for a peer-to-peer (P2P) network. In general, the virtual peer is a logical construct enabling a number of virtual peer members to appear as a single peer node in the P2P network. In operation, a sponsoring agent creates and registers a virtual peer including a number of virtual peer members with the P2P network. Once registered, the virtual peer appears as a new peer node in the P2P network, wherein the sponsoring agent operates as the communication end-point for the virtual peer in the P2P network. Thereafter, when the sponsoring agent receives an incoming message on behalf of the virtual peer, the sponsoring agent sends the incoming message to one or more of the virtual peer members. The sponsoring agent may broadcast the incoming message to all of the virtual peer members, multi-cast the incoming message to a select group of the virtual peer members, or send the incoming message to a select one of the virtual peer members. Alternatively, the sponsoring agent may redirect the requesting node that provided the request to one or more of the virtual peer members, thereby by-passing the sponsoring agent for the incoming message.

Regarding outgoing messages, a virtual peer member may provide an outgoing message to the sponsoring agent. In response, the sponsoring agent processes the outgoing message to provide an outgoing message originating from the virtual peer and provides the outgoing message to the desired recipient. In another embodiment, the sponsoring agent may provide virtual peer credentials, such as the peer identifier (ID) for the virtual peer, to the virtual peer member. Thereafter, the virtual peer member may provide an outgoing message to a desired recipient on behalf of the virtual peer using the virtual peer credentials. To the desired recipient, the outgoing message appears to have originated from the virtual peer rather than the virtual peer member.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 10A-10B illustrate exemplary metadata according to one embodiment of the present invention;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
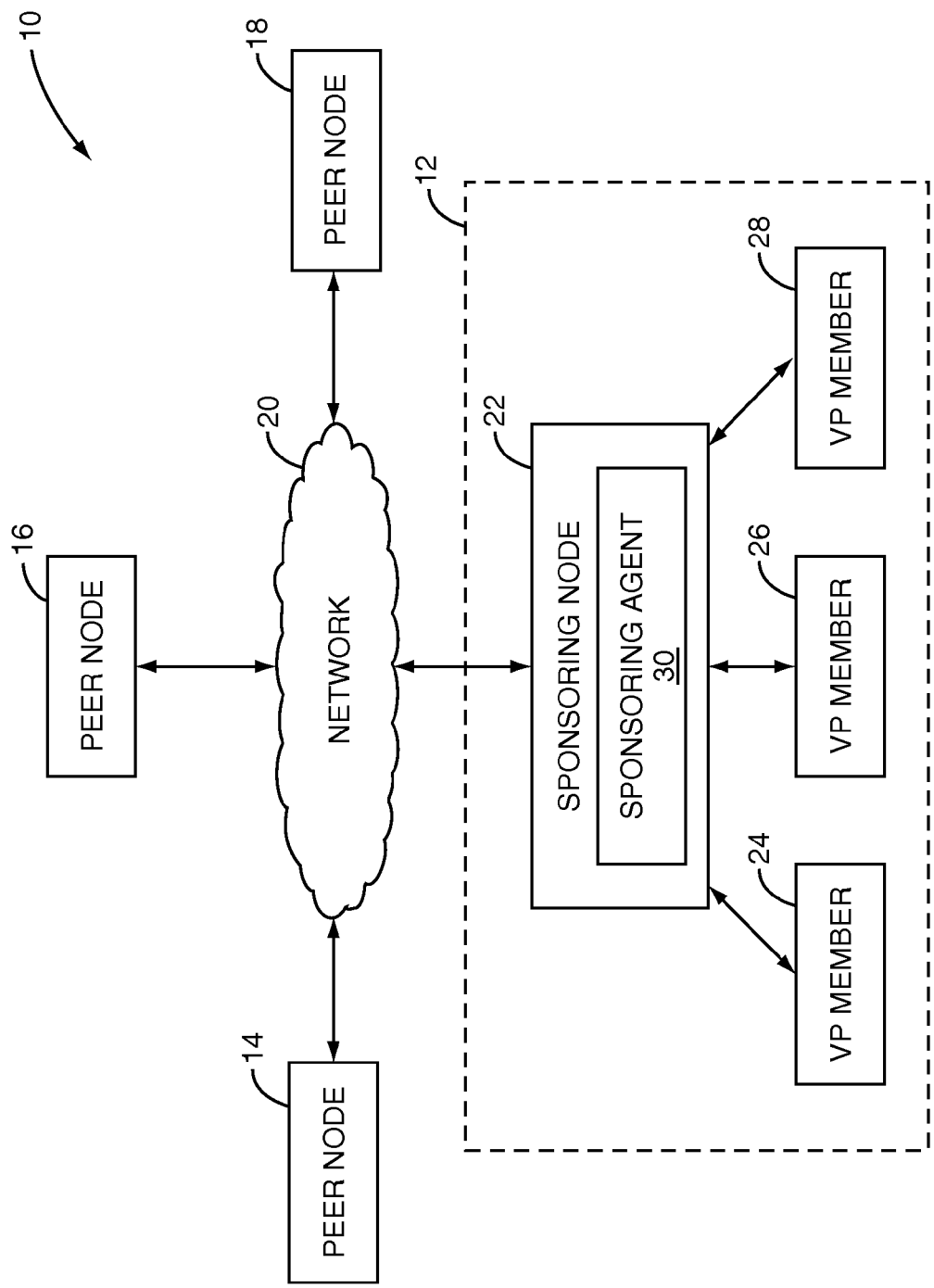
FIG. 1 illustrates a system forming a peer-to-peer (P2P) network including a virtual peer according to one embodiment of the present invention.

FIG. 1 illustrates a system 10 forming a peer-to-peer (P2P) network including a virtual peer 12 according to one embodiment of the present invention. In general, the system 10 includes the virtual peer 12 and a number of peer nodes 14-18 forming the P2P network over a network 20. In this embodiment, the virtual peer 12 includes a sponsoring node 22 and a number of virtual peer (VP) members 24-28. The sponsoring node 22 may be, for example, a server, a personal computer, a mobile telephone, a Personal Digital Assistant (PDA), a Personal Video Recorder (PVR) similar to a TiVo® personal video recorder, or the like capable of accessing the network 20. The sponsoring node 22 may or may not be a peer node in the P2P network. In addition, the sponsoring node 22 may or may not be a member of the virtual peer 12. The sponsoring node 22 includes a sponsoring agent 30. The sponsoring agent 30 is preferably implemented in software. However, the present invention is not limited thereto. In operation, the sponsoring agent 30 creates the virtual peer 12, registers the virtual peer 12 with the P2P network, and operates as a communication end-point for the virtual peer 12 in the P2P network, as discussed below in more detail.

The VP members 24-28 may be other peer nodes in the P2P network; other virtual peers; independent user devices such as, for example, a personal computer, a mobile telephone, a PDA, or a PVR; a web server; a proxy server; or the like. Note that if, for example, the VP member 24 is a peer node in the P2P network or another virtual peer, the VP member 24 may be a member of the virtual peer 12 and independently addressable via the P2P network. In contrast, the VP member 24 may alternatively be an independent user device that is non-discoverable in the P2P network. It should also be noted that the VP members 24-28 may also be referred to herein as potential VP members 24-28. This is particularly the case before the VP members 24-28 have registered with the virtual peer 12 and are therefore not yet actual VP members 24-28.

The sponsoring agent 30 maintains communication sessions with the VP members 24-28. Optionally, to provide secure communication, the communication sessions between the sponsoring agent 30 and the VP members 24-28 and/or between the sponsoring agent 30 and the P2P network may be encrypted. While the VP members 24-28 are illustrated as having a direct connection to the sponsoring node 22 for clarity, the present invention is not limited thereto. In general, the VP members 24-28 may be connected to the sponsoring node 22 and thus the sponsoring agent 30 via any type of local or network connection. For example, the VP members 24-28 may be connected to the sponsoring node 22 via a direct communication link such as a wired connection or a local wireless connection. A local wireless connection may be, for example, a connection according to one of the suite of IEEE 802.11 standards, the Bluetooth standard, or the like. Alternatively, the VP members 24-28 may be connected to the sponsoring node 22 directly or indirectly via one or more nodes in the P2P network formed over the network 20 or another P2P network. As another alternative, the VP members 24-28 may be connected to the sponsoring node 22 over the Internet, a Wide Area Network (WAN), a Local Area Network (LAN), a cellular network, or any combination thereof using a connection oriented protocol such as the Transmission Control Protocol (TCP) or a connectionless protocol such as User Datagram Protocol (UDP). Further, multiple connections may be used between each of the VP members 24-28 and the sponsoring node 22.

As an example, if the VP member 24 is another peer node in the P2P network or another virtual peer, the sponsoring agent 30 may maintain a communication session using a connection oriented protocol or a connectionless protocol with the VP member 24 using the P2P network, a separate P2P network formed over the network 20, the Internet, or the like. Alternatively, even if the VP member 24 is another peer node in the P2P network or another virtual peer, the sponsoring agent 30 may maintain a communication session with the VP member 24 using a direct communication link such as a wired connection or a local wireless connection. As another example, if the VP member 24 is an independent user device, the sponsoring agent 30 may maintain a communication session with the sponsoring agent 30 using, for example, a wired connection, a local wireless connection, or a connection over the Internet.

The peer nodes 14-18 may be, for example, personal computers, mobile telephones, PDAs, PVRs, or the like capable of accessing the network 20, as will be apparent to one of ordinary skill in the art upon reading this specification. The network 20 may be a public distributed network such as the Internet. However, the present invention is not limited thereto. The network 20 may be any type of Wide Area Network (WAN), a Local Area Network (LAN), a Personal Area Network (PAN), a cellular network, or the like or any combination thereof and may include wired and/or wireless components.

Figure 2:
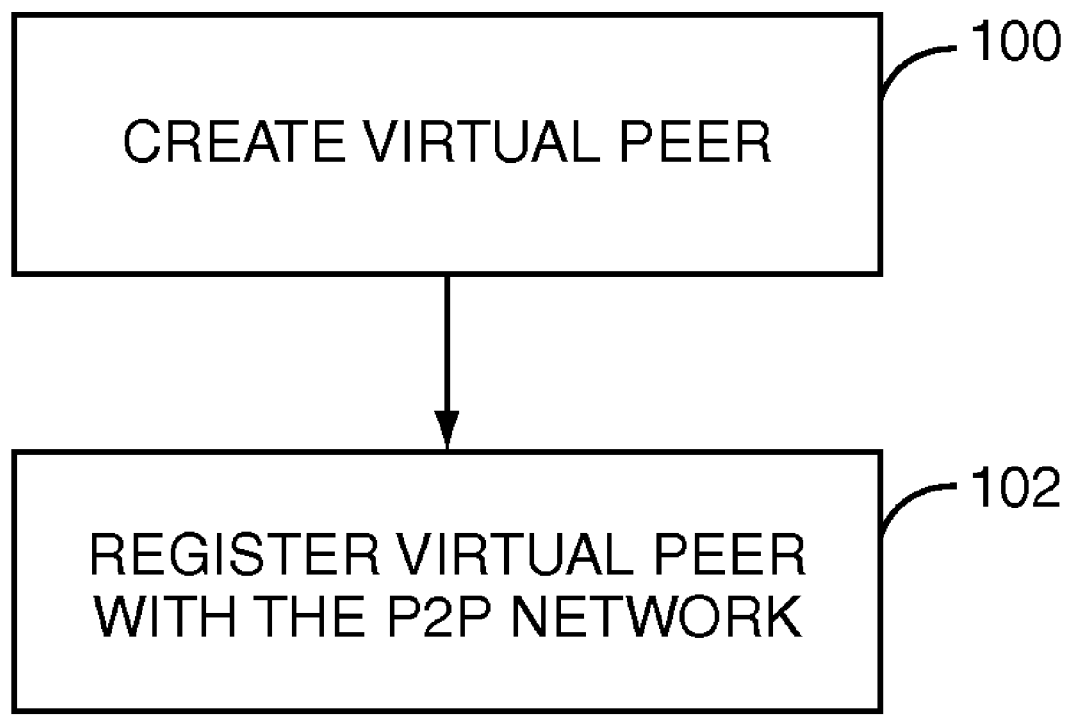
FIG. 2 illustrates the operation of the sponsoring agent of FIG. 1 to create and register the virtual peer according to one embodiment of the present invention.

FIG. 2 is a flow chart illustrating the operation of the sponsoring agent 30 to create the virtual peer 12 and to register the virtual peer 12 with the P2P network. The sponsoring agent 30 first creates the virtual peer 12 (step 100). More specifically, in one embodiment, the sponsoring agent 30 creates the virtual peer upon request from one or more potential VP members 24-28. In one embodiment, the virtual peer 12 is created for a particular owner or group of owners. Thus, for example, the potential VP member 24 may register with the sponsoring agent 30 and securely identify an owner of the potential VP member 24. Based on the identity of the owner of the VP member 24, the sponsoring agent 30 may either associate the potential VP member 24 with an existing virtual peer or create a new virtual peer. In this example, the sponsoring agent 30 creates a new virtual peer, which is the virtual peer 12. The potential VP member 24 is then registered with the virtual peer 12 and is therefore a VP member of the virtual peer. The other potential VP members 26-28 then register with the sponsoring agent 30. In this example, the owner of the virtual peer member 24 is also the owner of the potential VP members 26-28. As such, the sponsoring agent 30 adds the potential VP members 26-28 as VP members of the virtual peer 12. At this point, the virtual peer 12 creation is complete such that the VP members 24-28 are members of the virtual peer 12.

In another embodiment, the sponsoring agent 30 may actively create the virtual peer 12 by querying peer nodes such as the peer nodes 14-18 in the P2P network, querying user devices either directly coupled to the sponsoring node 22 or within a local wireless coverage area of the sponsoring node 22, or both in order to identify the VP members 24-28. As an example, in a manner similar to that discussed above, the query may include information identifying an owner of the virtual peer 12 or group of owners associated with the virtual peer 12. Peer nodes, virtual peer nodes, or independent user devices that are also owned by the owner of the virtual peer node 12 or one of the group of owners associated with the virtual peer 12 may respond to the query, thereby indicating that they desire to join the virtual peer 12. Based on the responses to the query, the VP members 24-28 are identified and registered with the virtual peer 12. At this point, the virtual peer 12 is created.

It should be noted that during the creation process, the sponsoring agent 30 may operate to authenticate the identities of the owners of the VP members 24-28 to prevent a peer node, virtual peer node, or independent user device of a malicious user from fraudulently becoming a member of the virtual peer 12. The sponsoring agent 30 may perform the authentication process using, for example, a password. Alternatively, the sponsoring agent 30 may use a third party authentication service, as will be apparent to one of ordinary skill in the art upon reading this specification.

The members of the virtual peer 12 may be dynamic such that new VP members may be added to the virtual peer 12 and/or existing VP members may be removed. For example, if the VP members 24-28 are mobile devices that establish connections with the sponsoring agent 30 via local wireless communication, the membership of the virtual peer 12 may dynamically change as the VP members 24-28 enter and leave the local wireless coverage area of the sponsoring node 22. In a similar fashion, the membership of the virtual peer 12 may change as the VP members 24-28 connect to or disconnect from the sponsoring agent 30.

Once the virtual peer 12 is created, the sponsoring agent 30 registers the virtual peer 12 with the P2P network (step 102). During registration, the sponsoring agent 30 receives or generates a peer identifier (ID) for the virtual peer 12 in the P2P network. Note that for some types of P2P networks, the sponsoring agent 30 may generate a globally unique peer ID for the virtual peer 12 using, for example, a Media Access Control (MAC) address of the sponsoring node 22. Once generated, the sponsoring agent 30 announces the peer ID to one or more nodes in the P2P network.

Once registered with the P2P network, the virtual peer 12 becomes a new peer in the P2P network. Note that if the sponsoring node 22 is also a peer node in the P2P network, the sponsoring node 22 and the virtual peer 12 have different peer IDs. Thus, the sponsoring node 22 may be addressed in the P2P network using the peer ID of the sponsoring node 22, while the virtual peer 12 may be addressed in the P2P network via the sponsoring agent 30 hosted by the sponsoring node 22 using the peer ID of the virtual peer 12. Using the virtual peer ID, the sponsoring agent 30 operates as an end-point for the virtual peer 12 in the P2P network.

The manner in which the sponsoring agent 30 registers the virtual peer 12 with the P2P network depends on the particular implementation of the P2P network. For example, in one embodiment, the sponsoring agent 30 registers the virtual peer 12 with a centralized or distributed registration agent for the P2P network. The sponsoring agent 30 may be required to register the virtual peer 12 with the P2P network only once or each time the virtual peer 12 becomes active. The virtual peer 12 may be active when one or more of the VP members 24-28 are connected to the sponsoring agent 30 which is referred to herein as being online; when all of the VP members 24-28 are online; or when one or more predetermined rules are satisfied, where the rules may consider the percentage of the VP members 24-28 that are online, throughput, latency, or the like. Alternatively, the virtual peer 12 may be active any time that the sponsoring node 22 is connected to the network 20 even when none of the VP members 24-28 are online. This may be beneficial in the situation where the sponsoring node 22 caches content, or digital assets, hosted by the VP members 24-28 and is therefore capable of serving requests for content hosted by the VP members 24-28 even when the VP members 24-28 are offline.

In addition, the sponsoring agent 30 may be required to provide periodic status or presence updates to the P2P network and provide information such as metadata describing the content, or digital assets, hosted by the virtual peer 12, the capabilities of the virtual peer 12, user information, or the like. The content hosted by the virtual peer 12 is the content hosted by the VP members 24-28. Thus, the sponsoring agent 30 may communicate with the VP members 24-28 to obtain the needed metadata and provide the metadata to the P2P network. Likewise, the sponsoring agent 30 may obtain the user information from one of more of the VP members 24-28. As for the capabilities of the virtual peer 12, the P2P network may adjust its network topology based on the capabilities of the peer nodes including the virtual peer 12 in the P2P network. Thus, in one embodiment, the sponsoring agent 30 may provide the capabilities of the sponsoring node 22 to the P2P network as the capabilities of the virtual peer 12. However, if, for example, the sponsoring node 22 is a high speed server, reporting the capabilities of the sponsoring node 22 to the P2P network as the capabilities of the virtual peer 12 may result in the selection of the virtual peer 12 as a super or ultra peer node in a FastTrack or similar P2P network. This may or may not be desirable. As such, the sponsoring agent 30 may adjust the perceived capabilities and/or reported capabilities of the sponsoring node 22 to avoid being selected as a super or ultra peer in the P2P network.

The sponsoring agent 30 may also provide failover and load balancing by establishing communication with other sponsoring agents hosted by other sponsoring nodes. Thus, if, for example, the sponsoring node 22 fails for any reason, one of the other sponsoring agents may take over as the sponsoring agent of the virtual peer 12. If the sponsoring node 22 returns to normal operation, the sponsoring agent 30 may resume operation as the sponsoring agent of the virtual peer 12.

It should be noted that under certain circumstances, the virtual peer 12 has no VP members. For example, rather than registering the virtual peer 12 with the P2P network after the VP members 24-28 are identified, the sponsoring agent 30 may register the virtual peer 12 with the P2P network before the VP members 24-28. As another example, since the membership in the virtual peer 12 may vary and the VP members 24-28 may go offline, at some point after creation, there may be no active members in the virtual peer 12. In this case, the sponsoring agent 30 may continue to respond to requests on behalf of the virtual peer 12 either based on cached information or by providing an "unavailable" response.

Figure 3A:
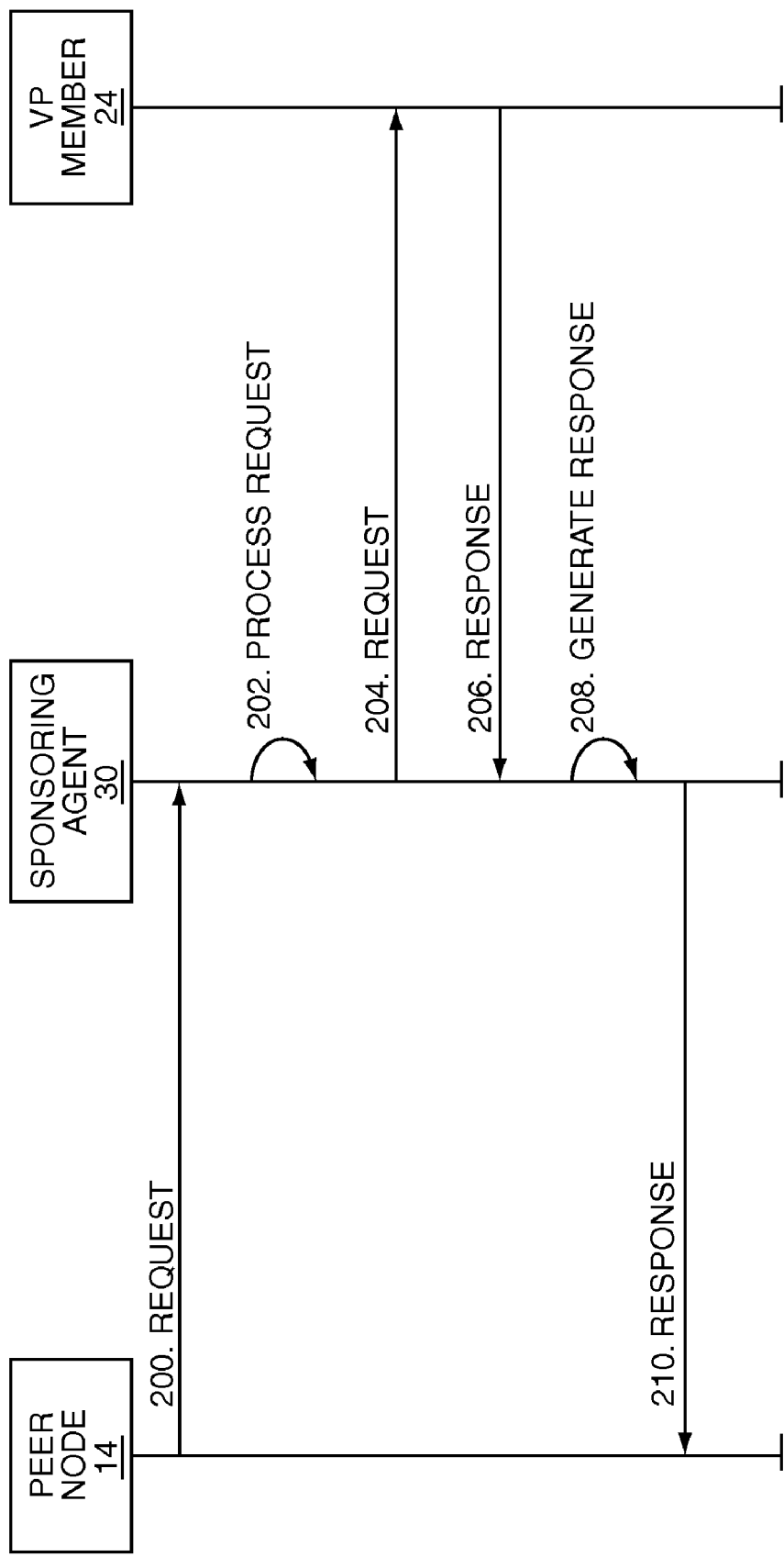
FIGS. 3A-3D illustrate the operation of the sponsoring agent of FIG. 1 during P2P communication according to various embodiments of the present invention.

FIGS. 3A-3D illustrate the operation of the sponsoring agent 30 to effect P2P communication with the virtual peer according to various embodiments of the present invention. In FIG. 3A, a peer node, which in this example is the peer node 14, provides a request to the sponsoring agent 30 of the virtual peer 12 (step 200). Upon receiving the request, the sponsoring agent 30 processes the request (step 202). More specifically, if communication over the P2P network is encrypted, the sponsoring agent 30 may decrypt the request. In addition, the sponsoring agent 30 may apply one or more security rules to perform a filtering process. For example, the sponsoring agent 30 may maintain a whitelist identifying a number of peer nodes from which requests are permitted, a blacklist identifying a number of peer nodes from which requests are not permitted, or both. Other types of security rules will be apparent to one of ordinary skill in the art upon reading this specification.

In this embodiment, the sponsoring agent 30 may also process the request in order to identify one of the VP members 24-28 for serving the request, which in this example is the VP member 24. For instance, if the request is for a particular digital asset such as a particular video, the sponsoring agent 30 may identify one or more of the VP members 24-28 that host the video by, for example, querying the VP members 24-28 and then select one of the VP members 24-28 to serve the request based on, for example, the connection speeds of the VP members 24-28, load conditions, or the like. The sponsoring agent 30 may also encrypt the request prior to transmission to one or more of the VP members 24-28.

The sponsoring agent 30 then transfers the processed request to the VP member 24 (step 204). The VP member 24 sends a response to the sponsoring agent 30 including the requested digital asset (step 206). The sponsoring agent 30 then generates a response to be transferred to the peer node 14 (step 208). More specifically, the sponsoring agent 30 may perform encryption and/or decryption functions. In addition, the sponsoring agent 30 may process the response such that it is digitally signed by the virtual peer 12. The sponsoring agent 30 then transfers the response to the peer node 14 (step 210).

In an alternative embodiment, rather than identifying the one of the VP members 24-28 for serving the request, the sponsoring agent 30 broadcasts the request to all of the VP members 24-28. The VP member 24-28 hosting the requested content may then respond.

As another alternative, if, for example, the request is for a particular digital asset and more than one of the VP members 24-28 hosts the particular digital asset, the sponsoring agent 30 may request different segments of the particular digital asset from each of the VP members 24-28 hosting the particular digital asset such that the different segments of the digital asset are concurrently transferred to the sponsoring node 22. By doing so, the digital asset may be quickly transferred to the sponsoring node 22 while reducing load conditions at the VP members 24-28. Further, if segments of the requested digital asset are received from multiple VP members 24-28, the sponsoring agent 30 may combine the segments to provide the requested digital asset prior to transferring the requested digital asset to the peer node 14. Alternatively, the segments may be sequentially or concurrently provided to the peer node 14, where the peer node 14 thereafter combines the segments to provide the requested digital asset.

While FIG. 3A focuses on a request provided to the virtual peer 12 and a response from the virtual peer 12, any incoming or outgoing message may be similarly processed. More specifically, an outgoing message from the VP member 24 may first be provided to the sponsoring agent 30. The sponsoring agent 30 may then package and digitally sign the outgoing message and forward the outgoing message to the appropriate peer node in the P2P network.

Figure 3B:
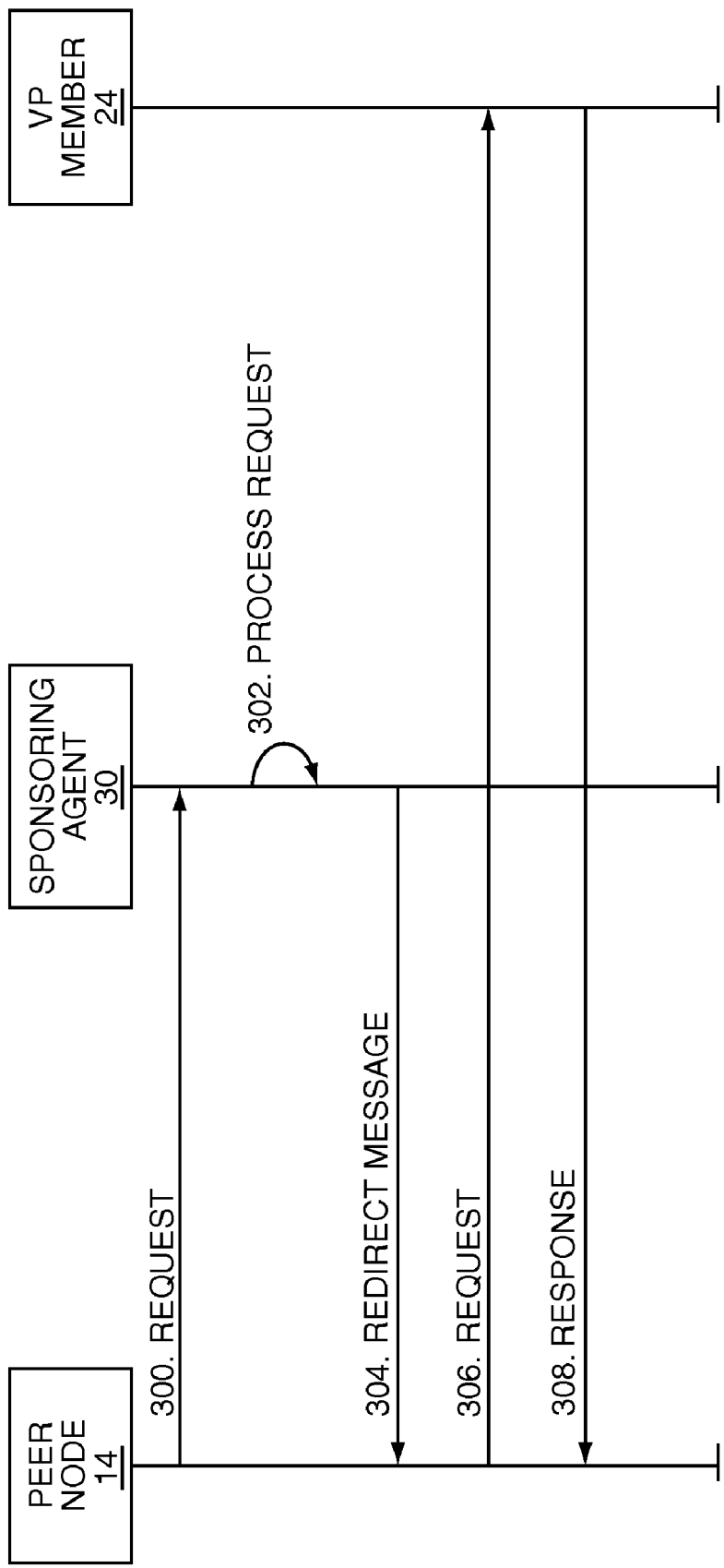

FIG. 3B illustrates the operation of the sponsoring agent 30 according to a second embodiment of the present invention. Generally, in this embodiment, the sponsoring node 30 operates to effect a by-pass connection between the peer node 14 and the VP member 24. First, the sponsoring agent 30 receives a request from the peer node 14 on behalf of the virtual peer 12 (step 300). The sponsoring agent 30 then processes the request (step 302). In one embodiment, the sponsoring agent 30 is configured or implemented such that by-pass connections are established for all requests. However, in another embodiment, the sponsoring agent 30 uses one or more rules to determine whether a by-pass connection is to be established. The rules may be general rules applicable to all of the VP members 24-28 or may be member specific rules. As an example, the sponsoring agent 30 may having a general rule that requests for digital assets having a file size greater than a predetermined threshold are to be processed by effecting a by-pass connection. In addition or alternatively, the rules may consider criteria such as the capabilities of the VP members 24-28, the type of digital asset requested, the peer ID of the peer node 14, the owner of the peer node 14, or the like. Numerous additional or alternative criteria will be apparent to one of ordinary skill in the art upon reading this specification.

In this example, a by-pass connection is to be established. As such, the sponsoring agent 30 identifies the VP member to serve the request. The sponsoring agent 30 may identify the VP member to serve the request by, for example, querying the VP members 24-28 to identify one or more of the VP members 24-28 capable of serving the request. The sponsoring agent 30 then selects one of the VP members 24-28 to serve the request based on, for example, load conditions, latency, or the like. In this example, the selected VP member is the VP member 24.

Next, the sponsoring agent 30 sends a redirect message to the peer node 14 (step 304). Generally, the redirect message includes sufficient information to enable the peer node 14 to establish a direct P2P connection to the VP member 24. For example, the redirect message may include a peer ID or Uniform Resource Locator (URL) of the VP member 24 and optionally credentials such as a password or token enabling the peer node 14 to connect to the VP member 24. Based on the redirect message, the peer node 14 sends a request to the VP member 24 (step 306). In response, the VP member 24 transfers the requested digital asset to the peer node 14 via a direct P2P connection, thereby by-passing the sponsoring agent 30 (step 308).

Before proceeding, it should be noted that in an alternative embodiment, if more than one of the VP members 24-28 is capable of serving the request, then the sponsoring agent 30 may select more than one or all of them to serve the request concurrently. More specifically, if two of the VP members 24-28 are capable of serving the request, the sponsoring agent 30 may select one of the two VP members to serve a first portion of the requested digital asset and select the other of the two VP members to serve the remaining portion of the requested digital asset. The peer node 14 may then be redirected to the two VP members such that the two portions of the digital asset are served concurrently from the two VP members.

As another alternative, rather than identifying one or more of the VP members 24-28 to which to redirect the request, the sponsoring agent 30 may redirect the peer node 14 to all of the VP members 24-28. In response, the peer node 14 may multicast a request to the VP members 24-28 or step through the VP members 24-28 until the VP member hosting the requested content is identified.

While FIG. 3B focuses on a request provided to the virtual peer 12 and response from the virtual peer 12, any incoming or outgoing message may be similarly processed. More specifically, an outgoing message from the VP member 24 may first be provided to the sponsoring agent 30. The sponsoring agent 30 may then send a redirect message directing the VP member 24 to make a direct P2P connection with the peer node 14.

Figure 3C:
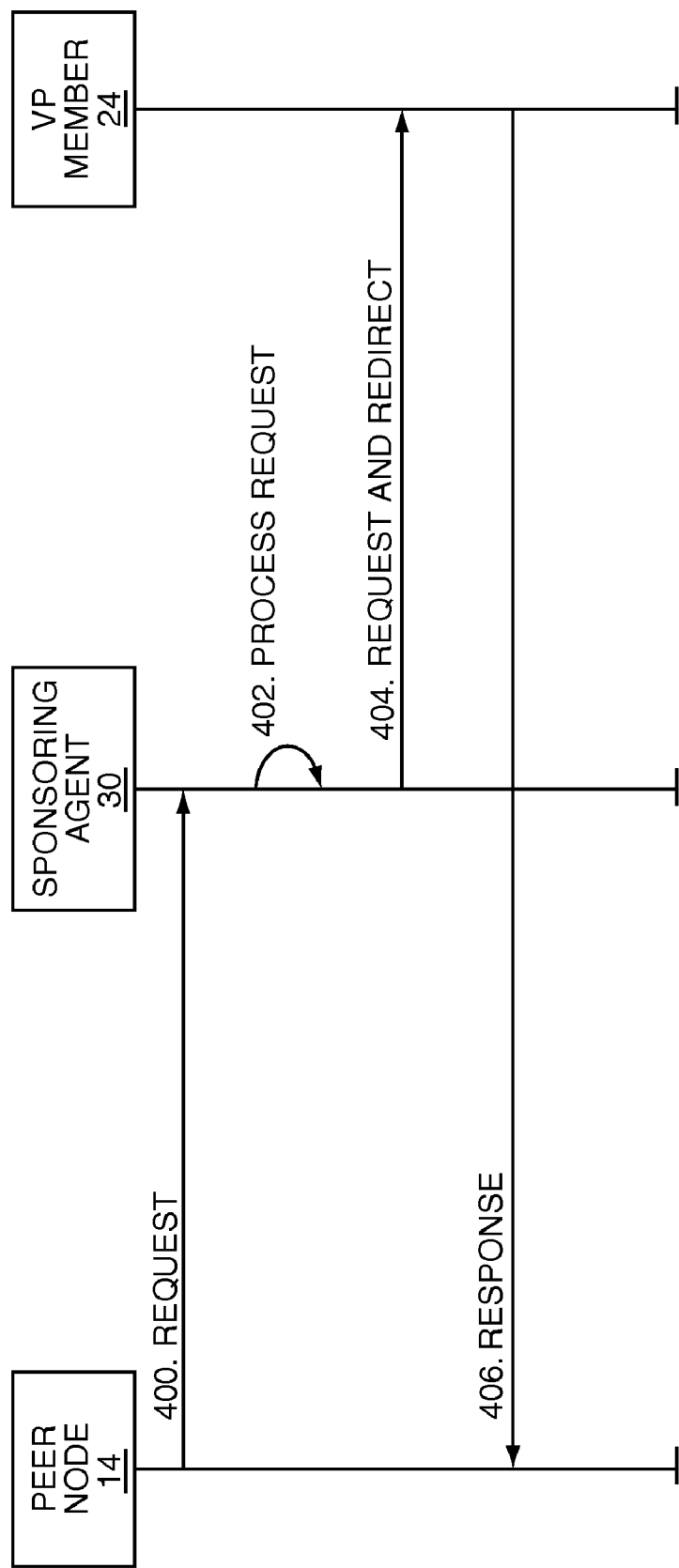

FIG. 3C illustrates the operation of the sponsoring agent 30 according to a third embodiment of the present invention. Generally, in this embodiment, the sponsoring node 30 operates to direct the VP member 24 to respond directly to the peer node 14, thereby effecting a by-pass connection between the peer node 14 and the VP member 24. First, the sponsoring agent 30 receives a request from the peer node 14 on behalf of the virtual peer 12 (step 400). The sponsoring agent 30 then processes the request (step 402). In one embodiment, the sponsoring agent 30 is configured or implemented such that by-pass connections are established for all requests. However, in another embodiment, the sponsoring agent 30 uses one or more rules to determine whether a by-pass connection is to be established. As discussed above, the rules may be general rules applicable to all of the VP members 24-28 or may be member specific rules. The rules may consider criteria such as the file size of the requested digital asset, the capabilities of the VP members 24-28, the type of digital asset requested, the peer ID of the peer node 14, the owner of the peer node 14, or the like. Numerous additional or alternative criteria will be apparent to one of ordinary skill in the art upon reading this specification.

In this example, a by-pass connection is to be established. As such, the sponsoring agent 30 identifies the VP member to serve the request. The sponsoring agent 30 may identify the VP member to serve the request by, for example, querying the VP members 24-28 to identify one or more of the VP members 24-28 capable of serving the request and then selects one of the VP members 24-28 to serve the request. In this example, the selected VP member is the VP member 24.

Next, the sponsoring agent 30 sends a request including redirect information to the VP member 24 (step 404). Generally, the redirect information includes sufficient information to enable the VP member 24 to establish a direct P2P connection to the peer node 14. For example, the redirect information may include a peer ID or URL of the peer node 14 and optionally credentials such as a password or token enabling the VP member 24 to connect to the peer node 14. Based on the request, the VP member 24 then establishes a connection with the peer node 14 and sends a response to the peer node 14 (step 406).

Alternatively, if more than one of the VP members 24-28 is capable of serving the request, then the sponsoring agent 30 may select more than one or all of them to serve the request concurrently. More specifically, if two of the VP members 24-28 are capable of serving the request, the sponsoring agent 30 may select one of the two VP members to serve a first portion of the requested digital asset and select the other of the two VP members to serve the remaining portion of the requested digital asset. The sponsoring agent 30 may then instruct the two VP members to establish a direct P2P connection with the peer node 14 such that the two portions of the digital asset are concurrently served to the peer node 14. As an alternative, the sponsoring agent 30 may broadcast the request to all of the VP members 24-28. One or more of the VP members 24-28 hosting the requested content may then respond to the peer node 14. Note that the VP members 24-28 hosting the requested content may coordinate transfer of the requested content such that only one of the VP members 24-28 transfers the requested content to the sponsoring node 22 or multiple VP members 24-28 each transfer a segment of the requested content to the sponsoring node 22.

Again, while FIG. 3C focuses on a request provided to the virtual peer 12 and a response from the virtual peer 12, any incoming or outgoing message may be similarly processed. More specifically, an outgoing message from the VP member 24 may first be provided to the sponsoring agent 30. The sponsoring agent 30 may then instruct the VP member 24 to make a direct P2P connection with the peer node 14.

Figure 3D:
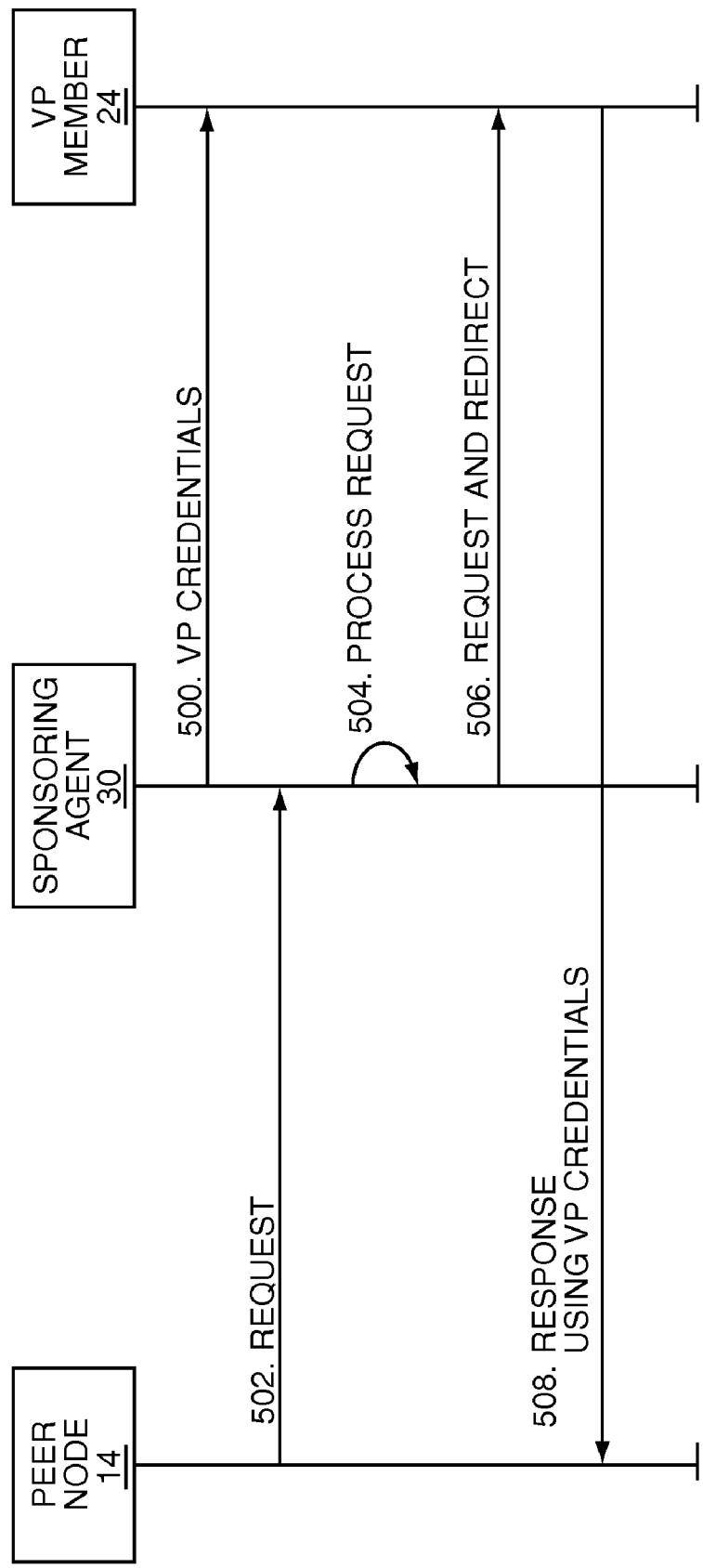

FIG. 3D illustrates the operation of the sponsoring agent 30 according to a fourth embodiment of the present invention. Generally, this embodiment is similar to that in FIG. 3C. However, in this embodiment, the VP member 24 uses the credentials of the virtual peer 12 when directly responding to the peer node 14 such that the identity of the VP member 24 is not revealed to the peer node 12. To the peer node 14, it appears as though the virtual peer 12, rather than the VP member 24, provides the response.

More specifically, in this example, the sponsoring agent 30 provides the credentials of the virtual peer 12 to the VP members 24-28 during, for example, registration of the VP members 24-28 with the virtual peer 12 (step 500). Alternatively, the virtual peer credentials may be provided to the VP member 24 as needed. The credentials of the virtual peer 12 may include all information needed by the VP member 24 to send non-repudiated messages to the P2P network on behalf of the virtual peer 12. The credentials may include the peer ID of the virtual peer 12, encryption/decryption information such as public and private key information, information needed to digitally sign messages on behalf of the virtual peer 12, or the like.

At some point in time, the sponsoring agent 30 receives a request from the peer node 14 on behalf of the virtual peer 12 (step 502). The sponsoring agent 30 then processes the request (step 504). In one embodiment, the sponsoring agent 30 is configured or implemented such that by-pass connections are established for all requests. However, in another embodiment, the sponsoring agent 30 uses one or more rules to determine whether a by-pass connection is to be established. As discussed above, the rules may be general rules applicable to all of the VP members 24-28 or may be member specific rules. The rules may consider criteria such as the file size of the requested digital asset, the capabilities of the VP members 24-28, the type of digital asset requested, the peer ID of the peer node 14, the owner of the peer node 14, or the like. Note that the rules may be executed entirely by the sponsoring agent 30 or collaboratively by the sponsoring agent 30 and the VP members 24-28. Further, the sponsoring agent 30 may execute a first set of rules and the VP members 24-28 may execute additional sets of rules, where the rules of the sponsoring agent 30 take precedent over the rules of the VP members 24-28. Numerous additional or alternative criteria will be apparent to one of ordinary skill in the art upon reading this specification.

In this example, a by-pass connection is to be established. As such, the sponsoring agent 30 identifies the VP member to serve the request. The sponsoring agent 30 may identify the VP member to serve the request by, for example, querying the VP members 24-28 to identify one or more of the VP members 24-28 capable of serving the request. The sponsoring agent 30 then selects one of the VP members 24-28 to serve the request. In this example, the selected VP member is the VP member 24.

Next, the sponsoring agent 30 sends a request including redirect information to the VP member 24 (step 506). Generally, the redirect information includes sufficient information to enable the VP member 24 to establish a direct P2P connection to the peer node 14. For example, the redirect information may include a peer ID or URL of the VP member 24 and optionally credentials such as a password or token enabling the VP member 24 to connect to the peer node 14. In addition, as an alternative, the VP credentials may be provided to the VP member 24 along with the request and redirect information. Then, using the credentials of the virtual peer 12, the VP member 24 establishes a connection with the peer node 14 and sends a response to the peer node 14 (step 508). Again, by using the credentials of the virtual peer 12, the identity of the VP member 24 is not revealed. To the peer node 14, it appears as though the virtual peer 12, rather than the VP member 24, provided the response.

As an alternative, the sponsoring agent 30 may broadcast the request and redirect information to all of the VP members 24-28. One of the VP members 24-28 hosting the requested content may then respond to the peer node 14 using the VP credentials.

Again, while FIG. 3D focuses on a request provided to the virtual peer 12 and a response from the virtual peer 12, any incoming or outgoing message may be similarly processed. More specifically, using the credentials of the virtual peer 12, the VP member 24 may send an outgoing message to the peer node 14 in such as manner as to protect the identity of the VP member 24.

Figure 4:
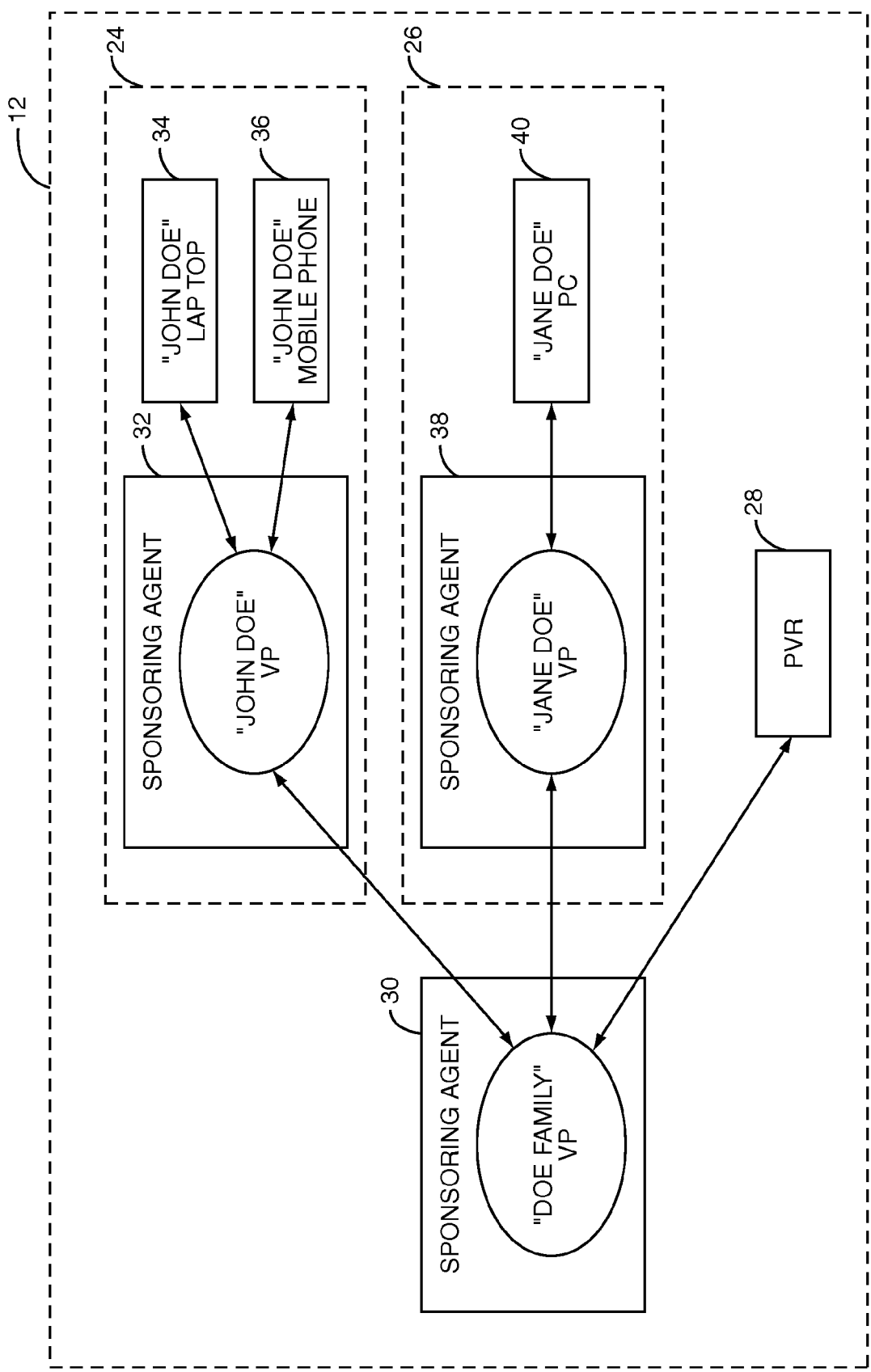
FIG. 4 illustrates an exemplary embodiment of the virtual peer of FIG. 1 according to one embodiment of the present invention.

FIG. 4 is an exemplary embodiment of the virtual peer 12. In this example, the virtual peer 12 includes nested virtual peers. More specifically, the sponsoring agent 30 creates and maintains the virtual peer 12, which in this example is a "Doe Family" virtual peer. The "Doe Family" virtual peer 12 includes the sponsoring agent 30 and the VP members 24-28. In this example, the VP member 24 is a "John Doe" virtual peer, the VP member 26 is a "Jane Doe" virtual peer, and the VP member 28 is a PVR. Turning to the VP member 24, a sponsoring agent 32 creates and maintains the "John Doe" virtual peer, which includes the sponsoring agent 32 and VP members 34 and 36. In this example, the VP members 34 and 36 are a laptop and mobile phone owned by "John Doe." As for the VP member 26, a sponsoring agent 38 creates and maintains the "Jane Doe" virtual peer, which includes the sponsoring agent 38 and VP member 40. In this example, the VP member 40 is a personal computer (PC) owned by "Jane Doe." Using the peer ID of the "Doe Family" virtual peer 12, the VP members 24-28 of the "Doe Family" virtual peer 12 appear as a single peer node. As such, the numerous devices 28, 34, 36, and 40 owned by the group of persons defined as the "Doe Family" are addressable in the P2P network as a single peer node. Note that while separate sponsoring agents 30, 32, and 38 are illustrated, the three virtual peers may be created and maintained using a single sponsoring agent.

Figure 5:
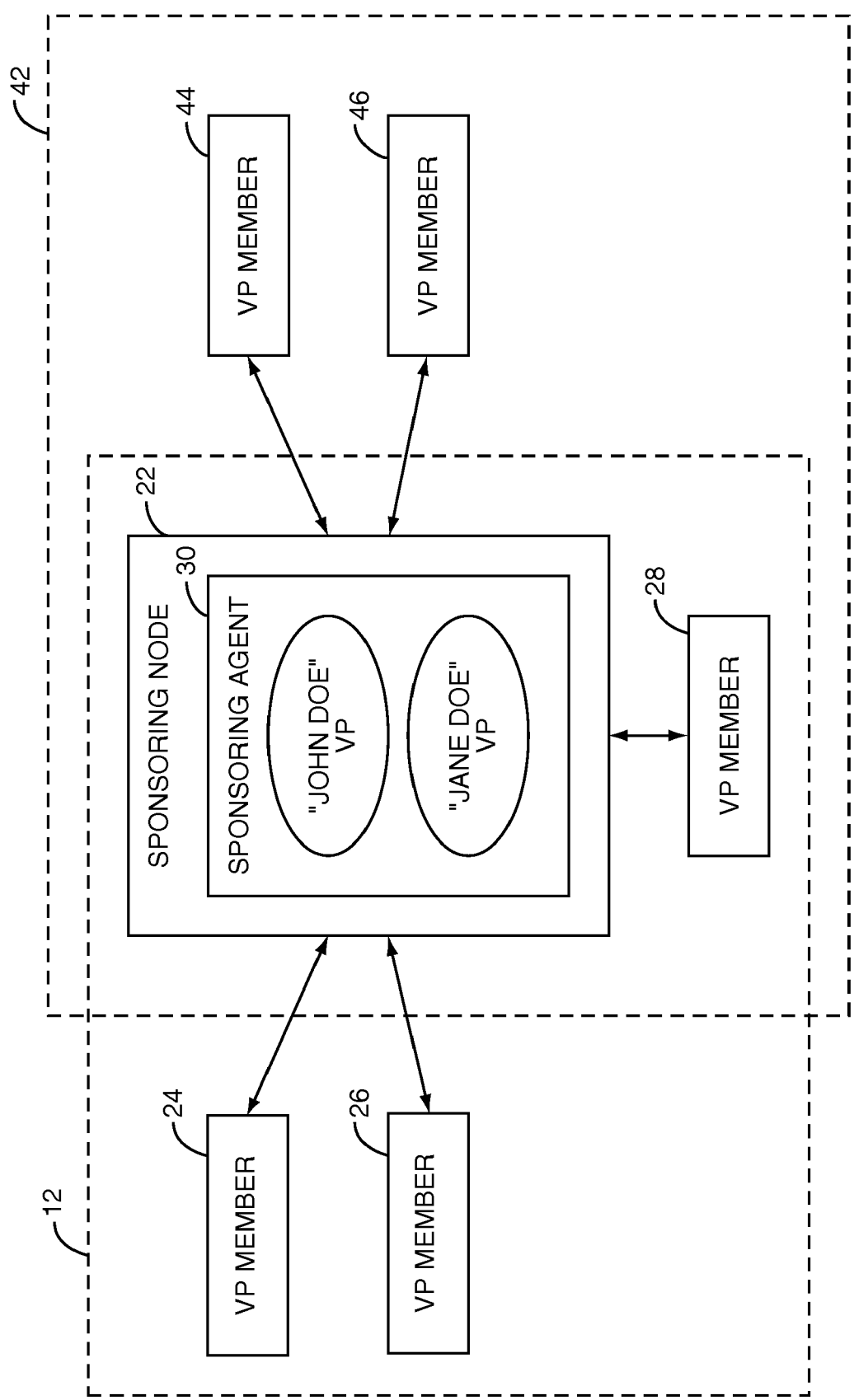
FIG. 5 illustrates an exemplary embodiment of a sponsoring agent hosting multiple virtual peers according to one embodiment of the present invention.

FIG. 5 illustrates additional concepts relevant to the present invention. More specifically, FIG. 5 illustrates the fact that the sponsoring agent 30 may create and maintain more than one virtual peer and that a VP member may be a member of more than one virtual peer. As illustrated, the sponsoring agent 30 operates to create and maintain the virtual peer 12, which in this example is referred to as the "John Doe" virtual peer, and a "Jane Doe" virtual peer 42. The "John Doe" virtual peer 12 includes the VP members 24-28, while the "Jane Doe" virtual peer 42 includes the VP member 28 and VP members 44 and 46. Thus, the VP member 28 is a member of both the "John Doe" virtual peer 12 and the "Jane Doe" virtual peer 42.

Regarding membership in multiple virtual peers, membership may be dynamically configured based on location and/or time. For example, a mobile device may be equipped with a Global Positioning System (GPS) receiver or the like. The mobile device may be configured such that the mobile device joins a first virtual peer when the mobile device is at or near a first location and joins a second virtual peer when the mobile device is at or near a second location. As an example, the mobile device may join a "home" virtual peer when the mobile device is at or near the user's home and may join an "office" virtual peer when the mobile device is at or near the user's office.

In a similar fashion, membership in virtual peers may be dependent on time of day. For example, a device may join a "work" virtual peer between the hours of 8:00 a.m. and 5:00 p.m. and may join a "home" virtual peer between the hours of 5:00 p.m. and 10:00 p.m.

Figure 6:
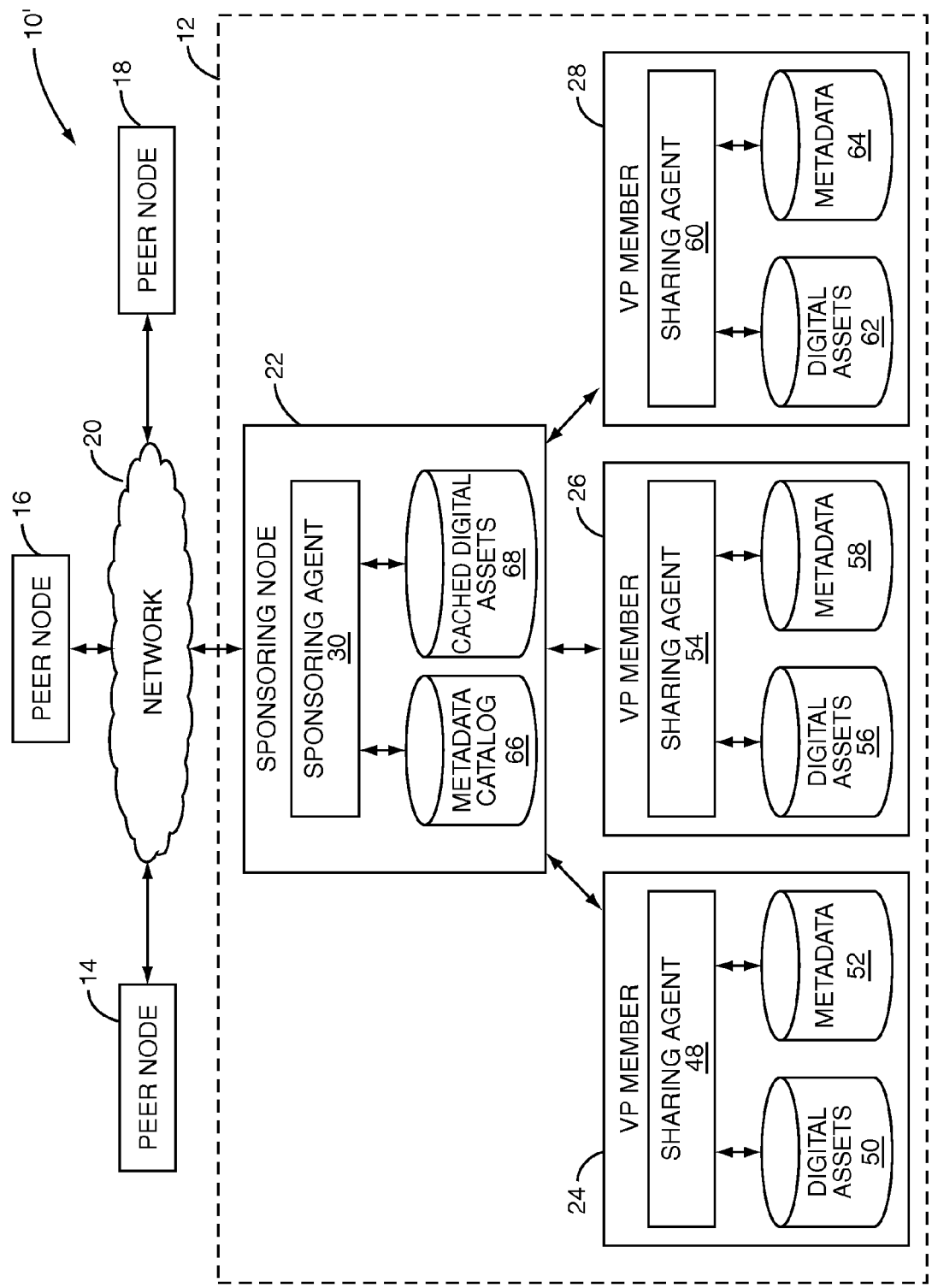
FIG. 6 illustrates a P2P content sharing system including a virtual peer according to one embodiment of the present invention.

FIG. 6 illustrates the system 10 according to another embodiment of the present invention, wherein the system 10 forms a P2P content sharing system including the virtual peer 12. The system 10 is essentially the same as that described above with respect to FIG. 1. However, looking at the virtual peer 12, the VP member 24 includes a sharing agent 48, digital assets 50, and metadata 52. The sharing agent 48 is preferably implemented in software, but the present invention is not limited thereto. In general, the sharing agent 48 operates to enable sharing of all or a portion of the digital assets 50 hosted by the VP member 24 with the peer nodes 14-18 in the P2P network and optionally guest nodes connected to the P2P network.

The digital assets 50 may include, for example, images, videos, hypertext transfer markup language (HTML) code, documents, presentations, spreadsheets, graphics, audio, or the like. The metadata 52 generally includes information describing the digital assets 50 and optionally the VP member 24. Note that while the metadata 52 is illustrated as being separate from the digital assets 50, some digital asset file types enable metadata to be stored within the digital asset file. For example, the Joint Photographic Experts Group (JPEG) file format enables metadata such as keywords, annotations, resolution, size, camera settings, information describing the camera that captured the image, date and time of capture, location such as Global Positioning System (GPS) coordinates, and the like to be stored within the image file. The metadata 52 may also include information describing the VP member 24. For example, if the VP member 24 is a mobile telephone, the metadata 52 may optionally include the make and model of the mobile telephone; hardware and software capabilities of the mobile telephone such as processor, storage, and memory capabilities; and the like.

In a similar fashion, the VP member 26 includes a sharing agent 54, digital assets 56, and metadata 58; and the VP member 28 includes a sharing agent 60, digital assets 62, and metadata 64.

The sponsoring node 22 operates to store a metadata catalog 66 and cached digital assets 68 on behalf of the virtual peer 12. As discussed below, the metadata catalog 66 is all or a select portion of the metadata 52, 58, and 64 of the VP members 24-28. Likewise, the cached digital assets 68 are all or a select portion of the digital assets 50, 56, and 62 of the VP members 24-28. The metadata catalog 66 and the cached digital assets 68 are preferably stored in cache and used to serve content sharing requests from the peer nodes 14-18 in the P2P network without involving the VP members 24-28. However, the metadata catalog 66 and cached digital assets 68 may additionally or alternatively be stored or persisted in one or more digital storage devices such as one or more hard disk drives, one or more optical storage devices, or the like.

In operation, in one embodiment, the metadata 52, 58, and 64 or a select portion thereof is actively provided to or obtained by the sponsoring node 22. More specifically, looking at the VP member 24 as an example, the owner or user of the VP member 24 may select which of the digital assets 50 are to be shared via the P2P network. The users may select particular ones of the digital assets 50, 56 and 62 that are to be shared, select particular directories or folders of the digital assets 50, 56, and 62 that are to be shared, select particular files types that are to be shared, select one or more keywords used to tag or associated with digital assets to be shared, or the like. In addition, the users may define time-based or location-based rules for identifying ones of the digital assets 50, 56, and 62 to share. Many variations on how users may select digital assets to share will be apparent to one of ordinary skill in the art upon reading this specification. In addition, if, for example, the VP member 24 is a member of more than one virtual peer, the user may select which of the digital assets 50 are to be shared via each of the virtual peers.

The portion of the metadata 52 for the digital assets 50 to be shared and optionally the metadata for the VP member 24 may then be provided to the sponsoring agent 30 during registration with the virtual peer 12. Likewise, the metadata 58, 64 for the digital assets 56, 62 to be shared may be provided to the sponsoring agent 30 during registration of the VP members 26, 28 with the virtual peer 12. Alternatively, the sponsoring agent 30 may desire only predefined types of metadata. For example, for an image, the sponsoring agent 30 may only desire file size, resolution, keywords used to tag the image, and annotations. As such, the sponsoring agent 30 may request only the desired types of metadata from the VP members 24-28 or notify the VP members 24-28 of the desired types of metadata during registration. The VP members 24-28 may then filter the metadata 52, 58, and 64 for the digital assets 50, 56, and 62 to be shared and send the filtered metadata to the sponsoring agent 30. Alternatively, the sponsoring agent 30 may filter the metadata from the VP members 24-28.

As another alternative, the sponsoring agent 30 may identify popular digital assets or popular topics and desire only metadata for popular digital assets or digital assets related to the popular topics. The sponsoring agent 30 may identify the popular digital assets or popular topics by, for example, monitoring requests received on behalf of the virtual peer 12, monitoring requests received by a number of virtual peers including the virtual peer 12 hosted by the sponsoring agent 30, or querying a remote service. As such, the sponsoring agent 30 may request only the desired metadata from the VP members 24-28. The VP members 24-28 may then filter the metadata 52, 58, and 64 for the digital assets 50, 56, and 62 to be shared and send the filtered metadata to the sponsoring agent 30. Alternatively, the sponsoring agent 30 may filter the metadata from the VP members 24-28.

Once the sponsoring agent 30 receives the metadata from the VP members 24-28, the metadata is aggregated to provide the metadata catalog 66, which is stored in cache and/or persisted in a digital storage device. When aggregating the metadata from the VP members 24-28, the sponsoring agent 30 may apply general security rules to filter, or remove, sensitive metadata or metadata for sensitive content. For example, the sponsoring agent 30 may filter the metadata from the VP members 24-28 to remove metadata for the C:/WINDOWS directory. When aggregating the metadata from the VP members 24-28, the sponsoring agent 30 may additionally restructure the metadata into a desired directory structure. More specifically, the sponsoring agent 30 is not bound by the directory structures of the VP members 24-28. Thus, while the metadata from the VP members 24-28 may indicate a particular directory structure of the digital assets 50, 56, and 62, the sponsoring agent 30 may perform a restructuring process to create its own desired directory structure. In general, the sponsoring agent 30 may restructure the directory structure of the VP members 24-28 based on any metadata such as, for example, dates of creation, topics, ranges of file sizes, or the like.

Rather than actively obtaining the metadata from the VP members 24-28 during registration, the sponsoring agent 30 may implement a lazy retrieval scheme. Using the VP member 24 as an example, the sponsoring agent 30 may receive a request on behalf of the virtual peer 12 for a digital asset hosted by the VP member 24. According to the lazy retrieval scheme, the sponsoring agent 30 may then request the metadata for the requested digital asset from the VP member 24. In addition, the sponsoring agent 30 may request the metadata for all shared digital assets hosted by the VP peer 26 that are, for example, stored in the same directory as the requested digital asset from the VP member 24. Other variations of the lazy retrieval scheme will be apparent to one of ordinary skill in the art upon reading this specification.

Once the metadata 52, 58, and 64 is initially provided to the sponsoring node 22 and stored in the metadata catalog 66, the sponsoring agent 30 may interact with the VP members 24-28 to update the metadata catalog 66. More specifically, in a first embodiment, the VP members 24-28 push updates to the sponsoring agent 30. For example, if a new digital asset is added at the VP member 24, the VP member 24 may push metadata for the new digital asset to the sponsoring agent 30. In a similar fashion, if a digital asset is removed from the VP member 24, the VP member 24 may push an update to the sponsoring agent 30 notifying the sponsoring agent 30 of the removal of the digital asset. In a second embodiment, the VP members 24-28 may notify the sponsoring agent 30 when updates to the metadata are available. The sponsoring agent 30 may then request the updates when desired. In a third embodiment, the sponsoring agent 30 may periodically request updates, if any, from the VP members 24-28. In a fourth embodiment, the sponsoring agent 30 may operate according to a lazy updating scheme wherein the sponsoring agent 30 obtains updates to the metadata in response to requests for the associated cached digital assets 68 or in response to P2P content discovery requests.

It should be noted that the sponsoring agent 30 may control the amount of storage or cache space allocated for storage of metadata and digital assets for each of the VP members 24-28. In one embodiment, the VP members 24-28 may each be assigned a priority based on whether the owners of the VP members 24-28 have or have not paid a fee as part of joining the virtual peer 12. The VP members 24-28 whose owners paid the fee may be given a higher priority. The sponsoring agent 30 may then allocate storage space based on the priorities assigned to the VP members 24-28. Further, if the sponsoring agent 30 hosts more than one virtual peer, the sponsoring agent 30 may allocate storage and cache space among the virtual peers based on, for example, priorities assigned to the virtual peers.

In addition to obtaining the metadata and metadata updates from the VP members 24-28, the sponsoring agent 30 may operate to pre-cache or store all or a select portion of the digital assets 50, 56, and 62 of the VP members 24-28 to provide all or a portion of the cached digital assets 68 at the sponsoring node 22. In one embodiment, the sponsoring agent 30 may operate to identify digital assets that are stored on multiple ones of the VP members 24-28 using the metadata catalog 66. Note that the metadata catalog 66 may maintain multiple references for the same content where the content is hosted by multiple VP members 24-28 for purposes such as load balancing and the like. For instance, the sponsoring agent 30 may identify a particular digital asset that is stored on two of the VP members 24-28. As such, the sponsoring agent 30 may obtain the particular digital asset from one of the VP members 24-28 and store the particular digital asset as one of the cached digital assets 68. Thereafter, all requests for the particular digital asset are served from the cached digital assets 68.

In another embodiment, the sponsoring agent 30 may identify popular or frequently requested digital assets or topics based on previous requests received by the sponsoring agent 30 on behalf of the virtual peer 12 and/or requests received by the sponsoring agent 30 on behalf of one or more additional virtual peers hosted by the sponsoring agent 30. Alternatively, the sponsoring agent 30 may identify popular or frequently requested digital assets by querying a remote service. For example, the remote service may be a service monitoring virtual peers in the P2P network or requests made in the P2P network to identify popular digital assets or popular topics. As another example, the remote service may be a remote service such as an Internet search engine that identifies popular digital assets or topics based on search requests. The sponsoring agent 30 may then obtain popular digital assets or digital assets related to popular topics from the VP members 24-28 and store the digital assets as ones of the cached digital assets 68.

In a similar manner, the sponsoring agent 30 may identify popular keywords based on previous requests received by the sponsoring agent 30 on behalf of the virtual peer 12 and/or requests received by the sponsoring agent 30 on behalf of one or more additional virtual peers hosted by the sponsoring agent 30. Alternatively, the sponsoring agent 30 may identify popular keywords by querying a remote service. For example, the remote service may be a service monitoring virtual peers in the P2P network or requests made in the P2P network to identify popular digital assets or popular topics. As another example, the remote service may be a remote service such as an Internet search engine that identifies keywords based on search requests. The sponsoring agent 30 may then obtain digital assets tagged or associated with the popular keywords from the VP members 24-28 and store the digital assets as ones of the cached digital assets 68.

It should be noted that the above pre-caching schemes are exemplary and not intended to limit the scope of the present invention. Other pre-caching schemes will be apparent to one of ordinary skill in the art upon reading this specification.

Using the metadata catalog 66, the sponsoring agent 30 is enabled to efficiently serve content discovery requests. More specifically, the sponsoring agent 30 may receive a content discovery request from a node in the P2P network such as, for example, the peer node 14. The content discovery request may be for a particular digital asset hosted by the virtual peer 12, for a particular group or type of digital asset hosted by the virtual peer 12, for all digital assets hosted by the virtual peer 12, or the like. For example, the sponsoring agent 30 may receive a content discovery request on behalf of the virtual peer 12 for all digital assets hosted by the virtual peer 12 tagged or otherwise associated with a particular keyword or topic. As another example, the content discovery request may be for all content hosted by the virtual peer 12.

In response to the content discovery request, the sponsoring agent 30 searches the metadata catalog 66 to identify ones of the digital assets 50, 56, and 62 hosted by the virtual peer 12 that satisfy the content discovery request. The sponsoring agent 30 then generates and sends a response including a content reference for each of the identified digital assets to the requesting node. A content reference includes all or a portion of the metadata describing the corresponding digital asset such as, for example, file name, file size, date-last-modified, and creation date. In addition, the content reference may include a content fetch reference for the corresponding digital asset. The content fetch reference may resolve to the virtual peer 12. Alternatively, if by-passing of the sponsoring agent 30 is desired, the content fetch reference may resolve to the one of the VP members 24-28 hosting the digital asset.

If the metadata catalog 66 includes only a portion of the metadata 52, 58, and 64 for the digital assets 50, 56, and 62 shared by the VP members 24-28 and is unable to serve the content discovery request, the sponsoring agent 30 may forward the content discovery request to the VP members 24-28. The VP members 24-28 may then respond to the content discovery request through the sponsoring agent or respond directly to the requesting node. More specifically, in one embodiment, the VP members 24-28 respond to the sponsoring agent 30, and the sponsoring agent 30 aggregates the responses and provides the aggregate response to the requesting node. In another embodiment, the VP members 24-28 may each by-pass the sponsoring agent 30 to provide responses to the requesting node. As discussed above, the VP members 24-28 may use the credentials of the virtual peer 12 to provide the responses on behalf of the virtual peer 12.

Using the cached digital assets 68, the sponsoring agent 30 is also enabled to efficiently serve content requests. More specifically, assuming that the peer node 14 sends a request to the virtual peer 12 for a particular digital asset, the sponsoring agent 30 receives the request on behalf of the virtual peer 12. If the requested digital asset is one of the cached digital assets 68 cached or stored at the sponsoring node 22, then the sponsoring agent 30 obtains the requested digital asset and transfers the requested digital asset to the peer node 14, thereby serving the request. Before sending the digital asset to the peer node 14, the sponsoring agent 30 may query the VP member 24 hosting the digital asset to determine whether the digital asset has been modified. If the digital asset has been modified, the sponsoring agent 30 may forward the request to the VP member 24. If the digital asset has not been modified, the sponsoring agent 30 serves the request.

If the requested digital asset is not one of the cached digital assets 68, then the sponsoring agent 30 forwards the request to one or more of the VP members 24-28. Then, as described above, one or more of the VP members 24-28 hosting the requested digital asset may transfer the requested digital asset to the sponsoring node 22, and the sponsoring agent 30 may then transfer the requested digital asset to the peer node 14 and optionally cache the requested digital asset as one of the cached digital assets 68. Alternatively, the sponsoring agent 30 may operate to effect a by-pass connection between one or more of the VP members 24-28 hosting the requested digital asset and the peer node 14, as described above.

When digital assets are cached as the digital assets are requested and transferred through the sponsoring agent 30, the sponsoring agent 30 may further operate to monitor the cached digital assets 68 and/or the metadata for the cached digital assets 68 to identify duplicate digital assets. Duplicate digital assets are a group of two or more digital assets that are the same or essentially the same digital asset regardless of whether the duplicate digital assets are cached for different virtual peers hosted by the sponsoring agent 30. If duplicate digital assets are identified, all but one of the duplicates may be removed from the cached digital assets 68. Thereafter, requests for any one of the duplicate digital assets may be served using the one of the duplicate digital assets retained in the cached digital assets 68.

When serving both content discovery requests and content requests, the sponsoring agent 30 may apply general sharing rules for the virtual peer 12 or sharing rules for each of the VP members 24-28. The sharing rules generally define who is permitted to access the digital assets shared by the virtual peer 12 or alternatively the digital assets shared by the VP members 24-28. Further, the VP members 24-28 may have different sharing rules for groups of digital assets such as directories or folders, groups of digital assets tagged with particular keywords, file types, or the like. In addition or alternatively, sharing rules based on client capabilities may be defined and used by the sponsoring agent 30. The client capabilities, such as the capabilities of the peer node 14, may be provided to the sponsoring agent 30, for example, as part of a request for content. As an example, a sharing rule may state that when requesting a digital asset having a file size greater than 1 MB, the client connection speed must be greater than 20 kbps in order for the client to have access to the requested digital asset. Other sharing rules based on various client capabilities will be apparent to one of ordinary skill in the art upon reading this specification.

In addition to processing content discovery requests and content requests, the sponsoring agent 30 may use the metadata catalog 66 and updates to the metadata catalog 66 to automatically send invitations inviting guests to view or otherwise consume the digital assets 50, 56, and 62 shared by the virtual peer 12. More specifically, the individual owners of the VP members 24-28 and/or the owner of the virtual peer 12 identify a number of guests and define digital assets that each of the guests is to be invited to consume. The guests may or may not be peers in the P2P network. The digital assets that a particular guest is to be invited to view may be identified by one or more directory names, one or more keywords used to tag the digital assets, file names, file types, or the like. These criteria for identifying digital assets that the guests are permitted to view are exemplary and are not intended to limit the scope of the present invention.

In operation, the owner of the virtual peer 12 may create a list of guests to whom invitations are to be automatically provided. For each guest, the owner of the virtual peer 12 identifies the digital assets or types of digital assets that the guest is to be invited to view or otherwise consume. Thereafter, the sponsoring agent 30 analyzes the metadata catalog 66 and updates to the metadata catalog 66 to identify digital assets hosted by the VP members 24-28 that the guests are to be invited to view. The sponsoring agent 30 then sends invitations to the guests including, for example, one or more links to the digital assets the guests are invited to consume. In one embodiment, the invitations are provided to the guests via e-mail. However, the present invention is not limited thereto. For example, the invitations may alternatively be sent using Instant Messaging (IM).

Likewise, the owners of the VP members 24-28 may each identify a list of guests and the digital assets or types of digital assets each of the guests is permitted to consume. For example, the owner or user of the VP member 24 may define a list of guests and identify the digital assets or types of digital assets that each of the guests is to be invited to consume. The guests of the owner of the VP member 24 may be limited to the digital assets 50 hosted by the VP member 24. Alternatively, subject to the invitation rules for the guests, the guests of the VP member 24, for example, may be permitted to consume the digital assets 50, 56, and 62 hosted by the VP members 24-28 in the virtual peer 12. The list of guests and rules for identifying digital assets that the guests are to be invited to consume are provided to the sponsoring agent 30. The sponsoring agent 30 analyzes the metadata catalog 66 and updates to the metadata catalog 66 to identify digital assets hosted by the VP member 24, or alternatively the VP members 24-28, that the guests of the owner of the VP member 24 are to be invited to consume. The sponsoring agent 30 then sends invitations to the guests inviting them to consume the identified digital assets.

The sponsoring agent 30 may also provide a Really Simple Syndication (RSS) feed, Atom feed, or the like to the peer nodes 14-18 or other potential guests via, for example, the P2P network or the Internet. Generally, RSS feeds, Atom feeds, or the like are referred to herein as web feeds. More specifically, as an example, the owner of the peer node 14 may register with the sponsoring agent 30, or some central service, to receive an RSS feed for the virtual peer 12. Thereafter, the sponsoring agent 30 generates the RSS feed based on the metadata catalog 66 and updates to the metadata catalog 66. Using the RSS feed, the owner of the peer node 14 can easily gain information describing digital assets hosted by the virtual peer 12 and digital assets recently added to the virtual peer 12, removed from the virtual peer 12, or modified or digital assets hosted by the virtual peer 12 having metadata that has been recently modified.

The sponsoring agent 30 may also enable users, such as users of the peer nodes 14-18, to modify or add to the metadata stored in the metadata catalog 66. For example, the user of the peer node 14 may view a video shared by the virtual peer 12 and want to add an annotation, keyword, or rating to the metadata for the video. Assuming that the metadata for the video is stored in the metadata catalog 66, the sponsoring agent 30 may enable the user of the peer node 14 to modify the metadata for the video stored in the metadata catalog 66 to add the annotation, keyword, or rating. Thereafter, the sponsoring agent 30 may or may not send an update for the metadata to the VP member 24-28 hosting the video.

The owner of the virtual peer 12 and/or the owners of the VP members 24-28 may define security rules for controlling access to the metadata catalog 66 for modification purposes. The security rules may be a list of users enabled to modify the metadata in the metadata catalog 66, a password that must be entered by a user before the user is permitted to modify the metadata in the metadata catalog 66, or the like. Further, security rules may be general or specific to the metadata for particular digital assets or groups of digital assets. For example, the owner of the VP member 24 may define separate security rules for each of a number of directories storing the digital assets 50 at the VP member 24 or for each of a number of groups of the digital assets 50 where the groups are formed based on keywords used to tag the digital assets 50. Note that security rules may be executed on the sponsoring agent 30 as well as the VP member 24. Further, the rules of the sponsoring agent 30 may have precedent over the rules of the VP member 24 in a hierarchy of security rules.

In one embodiment, the sponsoring agent 30 does not send the modifications to the metadata in the metadata catalog to the VP members 24-28. In another embodiment, the sponsoring agent 30 may forward the metadata or some of the modifications to the VP members 24-28. More specifically, as a first example, the sponsoring agent 30 may filter the modifications to remove explicit or vulgar annotations or keywords added to the metadata before providing updates to the VP members 24-28. As another example, the sponsoring agent 30 may provide only those modifications made by select users to the VP members 24-28. The select users may be a defined subset of the users permitted to modify the metadata stored in the metadata catalog 66. In a similar manner, the sponsoring agent 30 may notify the VP members 24-28 of updates to the metadata rather than automatically providing updates to the VP members 24-28. The VP members 24-28 may then request the updates if desired.

It should be noted that if the modifications to the metadata are not provided to the VP members 24-28 and the sponsoring node 22 does not store all of the metadata 52, 58, and 64 of the VP members 24-28, the sponsoring agent 30 may consider whether or not metadata has been modified in a caching scheme used for the metadata catalog 66.

The discussion above focuses on forming virtual peers based on ownership. More specifically, as discussed above, a virtual peer may be associated with an owner or a group of owners. As such, virtual peer members owned by the same owner or one of the group of owners of the virtual peer are identified and used to form the virtual peer. FIGS. 7-13 illustrate embodiments where virtual peers are formed based on metadata describing the owner or user of the virtual peer members, metadata describing content, or digital assets, hosted by the virtual peer members, metadata describing the virtual peer members, or any combination thereof.

Figure 7:
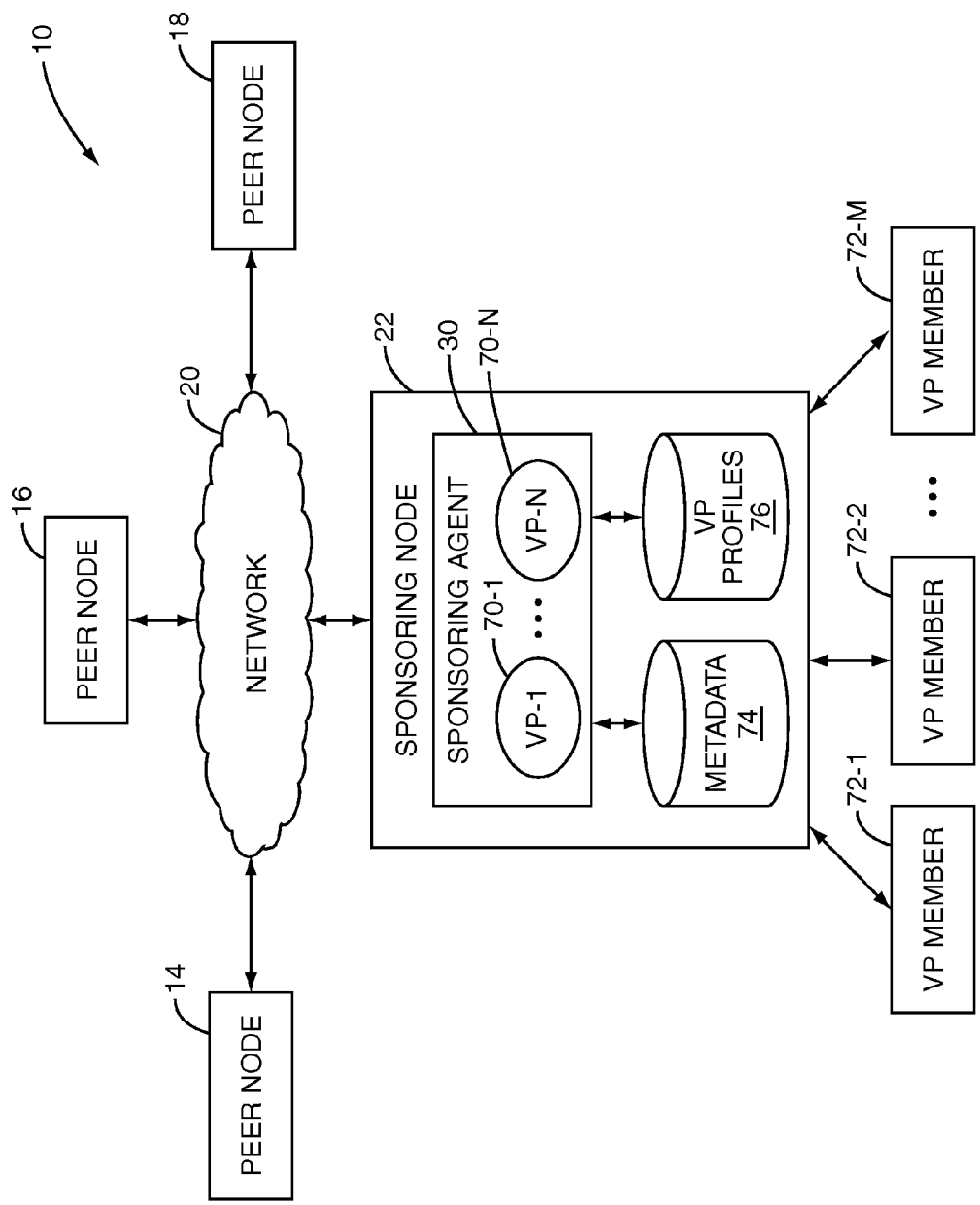
FIG. 7 illustrates a P2P network wherein virtual peers are formed based on metadata according to one embodiment of the present invention.

FIG. 7 illustrates the system 10 wherein the sponsoring agent 30 forms a number of virtual peers 70-1 through 70-N based on metadata according to another embodiment of the present invention. It should be noted that in this illustration and for all subsequent illustrations, the virtual peers 70-1 through 70-N are illustrated by the circles within the sponsoring agent 30. However, it should be appreciated that the virtual peers 70-1 through 70-N are formed by the sponsoring agent 30 and corresponding VP members 72-1 through 72-M communicatively coupled to the sponsoring node 22. The VP members 72-1 through 72-M may be peer nodes in the P2P network, other virtual peers, independent user devices, web servers, proxy server, or the like and may be communicatively coupled to the sponsoring node 22 via the P2P network, the network 20, direct wired connections, local wireless connections, or the like.

As discussed above, the system 10 includes the peer nodes 14-18 and the sponsoring node 22 each communicatively coupled to the network 20. In this embodiment, the sponsoring node 22 hosts sponsoring agent 30, where the sponsoring agent 30 operates to create and maintain, or host, the virtual peers 70-1 through 70-N. As discussed below, the virtual peers 70-1 through 70-N may be system-defined or user-defined. The sponsoring node 22 also includes a metadata database 74 and a VP profiles database 76. The metadata database 74 includes metadata from the VP members 72-1 through 72-M. The metadata may include user metadata describing users or owners of the VP members 72-1 through 72-M and/or hobbies and interests of the users or owners of the VP members 72-1 through 72-M, content metadata describing content, or digital assets, hosted by the VP members 72-1 through 72-M, VP member metadata describing the VP members 72-1 through 72-M, or any combination thereof. The VP profiles database 76 includes a profile for each of the virtual peers 70-1 through 70-N. For each of the virtual peers 70-1 through 70-N, the corresponding profile includes one or more selection criteria for selecting members for the virtual peer. In addition, the profile may include, for example, information describing the virtual peer.

As discussed below, based on a comparison of selection criteria for the virtual peers 70-1 through 70-N and the metadata for the potential VP members 72-1 through 72-M, the sponsoring agent 30 identifies or selects one or more of the virtual peers 70-1 through 70-N for each of the potential VP members 72-1 through 72-M, where the potential VP members 72-1 through 72-M are then registered as VP members of the selected ones of the virtual peers 70-1 through 70-N. Once members for the virtual peers 70-1 through 70-N are identified, the sponsoring agent 30 registers the virtual peers 70-1 through 70-N with the P2P network. Note that the virtual peers 70-1 through 70-N may alternatively be registered with the P2P network before the VP members for each of the virtual peers 70-1 through 70-N are identified.

Figure 8:
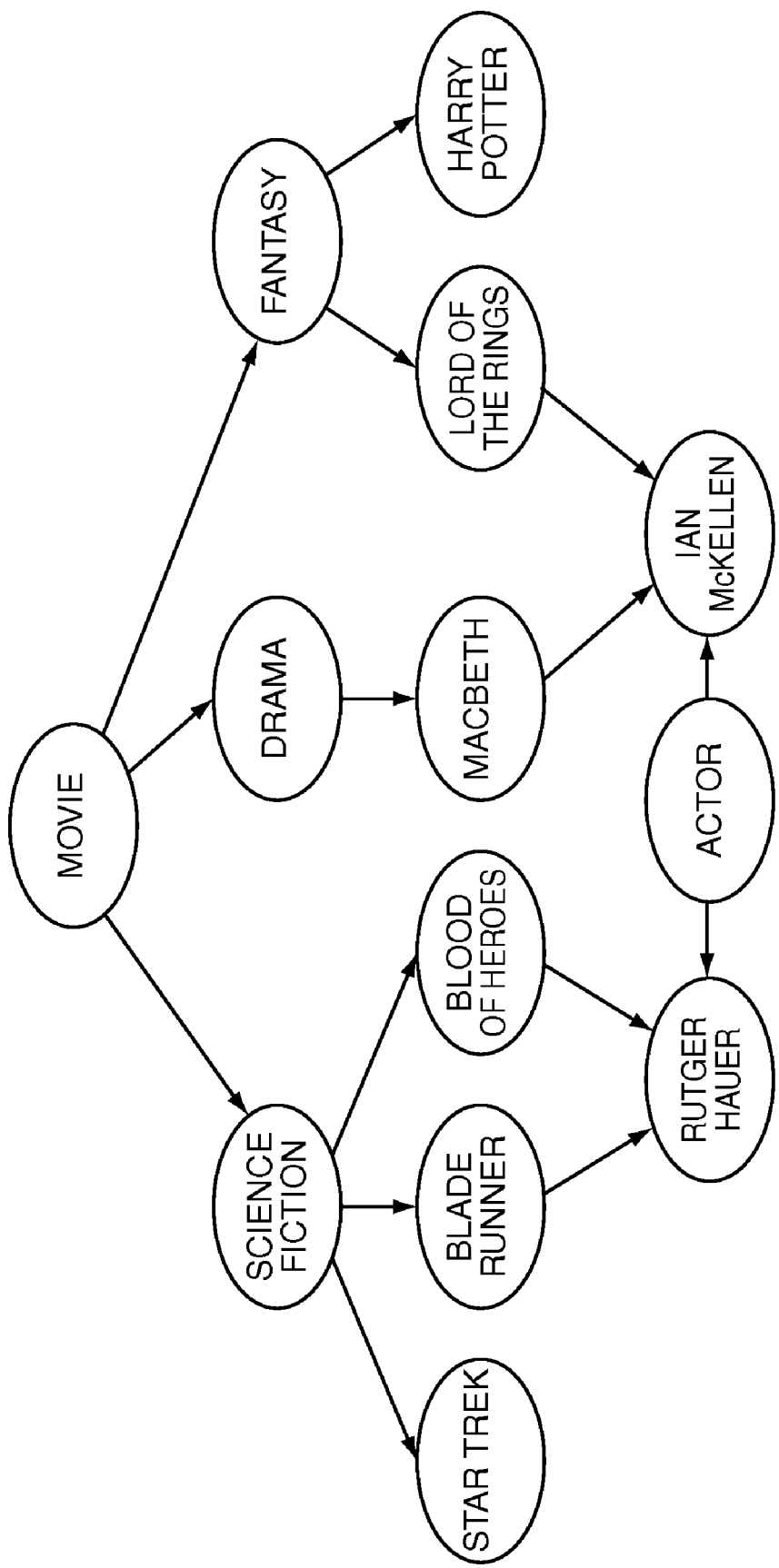
FIG. 8 illustrates an exemplary ontology that may be used to form virtual peers according to one embodiment of the present invention.

The virtual peers 70-1 through 70-N may be system-defined or user-defined. In one embodiment, the virtual peers 70-1 through 70-N are predefined and the profiles for the virtual peers 70-1 through 70-N are stored in the VP profiles database 76. Thus, in other words, the sponsoring agent 30 hosts a predefined set or list of virtual peers. In another embodiment, the sponsoring agent 30 stores or has access to an ontology. A portion of an exemplary ontology is illustrated in FIG. 8. As illustrated, the ontology includes a number of interrelated nodes such as "Science Fiction" and "Star Trek." It should be noted that the ontology may be stored locally at the sponsoring node 22 in the VP profiles database 76 or obtained from a remote service. In addition, the ontology may be predefined or automatically generated based on third-party content. For example, the sponsoring agent 30 or a remote service may monitor and analyze third-party content such as that provided by Wikipedia to provide the ontology. Using, for example, keyword density or natural language analysis, a list of keywords may be created for each node in the ontology or topic. The keywords may then be used as the selection criteria for the nodes in the ontology.

Returning to FIG. 7, each node in the ontology has associated selection criteria and corresponds to one of the virtual peers 70-1 through 70-N. By using the relationships in the ontology, the sponsoring agent 30 is enabled to control membership density for the virtual peers 70-1 through 70-N. For example, the virtual peers 70-1 through 70-3 may be a "Science Fiction" virtual peer, a "Blade Runner" virtual peer, and a "Blood of Heroes" virtual peer, respectively. At first, when membership is low, only the "Science Fiction" virtual peer 70-1 may be active. However, if the membership in the "Science Fiction" virtual peer 70-1 exceeds a threshold value, the sponsoring agent 30 may activate the virtual peers 70-2 through 70-3, reallocate the members of the "Science Fiction" virtual peer 70-1 to the virtual peers 70-2 through 70-3, and then deactivate the "Science Fiction" virtual peer 70-1. In this manner, the sponsoring agent 30 may control the membership density for the virtual peers 70-1 through 70-N.

In another embodiment, the virtual peers 70-1 through 70-N are user-defined. More specifically, a user such as a user of the VP member 72-1 may interact with the sponsoring agent 30 to define a profile for a user-defined virtual peer. The profile for the user-defined virtual peer may include the selection criteria for the virtual peer, a description of the virtual peer, management rules, access control rules defining which users are allowed to access the virtual peer, and the like. The management rules may include policies defining users who can alter the selection criteria for the virtual peer, who can alter the access control rules, and the like. Note that the user-defined virtual peer may be configured such that it is managed by multiple users. In addition, the sponsoring agent 30 may enforce overriding policies. For example, user-defined virtual peers owned by a non-premium user, which may be a user who does not pay a fee for the service, may be limited to 10 GB of digital assets or 1000 total members. Total members include members of nested virtual peers. Like the security rules, the management rules may be executed by the sponsoring agent 30 or by both the sponsoring agent 30 and the VP member 72-1.

In the system 10 of FIG. 7, the potential VP members 72-1 through 72-M share metadata with the sponsoring agent 30. Alternatively, for security purposes, rather than sharing actual metadata with the sponsoring agent 30, the VP members 72-1 through 72-M may provide ontological scores describing the metadata of the VP members 72-1 through 72-M. More specifically, for content or digital assets, a content ontology may be provided to the potential VP members 72-1 through 72-M. The potential VP members 72-1 through 72-M may then compare their content metadata to the content ontology using predefined predicates for each node in the ontology, thereby scoring the nodes of the content ontology. The scores may then be provided back to the sponsoring agent 30, where the content ontology and the scores are descriptive of the content metadata of the potential VP members 72-1 through 72-M. In a similar fashion, a user ontology may be scored for the metadata describing the users or owners of the potential VP members 72-1 through 72-M, and a device capability ontology may be scored for the metadata describing the potential VP members 72-1 through 72-M. For additional details of scoring nodes in an ontology, the interested reader is directed to U.S. patent application Ser. No. 11/359,632, entitled "Methods, Systems, and Products for Characterizing Target Systems," filed Feb. 22, 2006, which is hereby incorporated herein by reference in its entirety. Based on the metadata or ontological scores, the sponsoring agent 30 registers each of the potential VP members 72-1 through 72-M as a VP member of select ones of the virtual peers 70-1 through 70-N.

Figure 9:
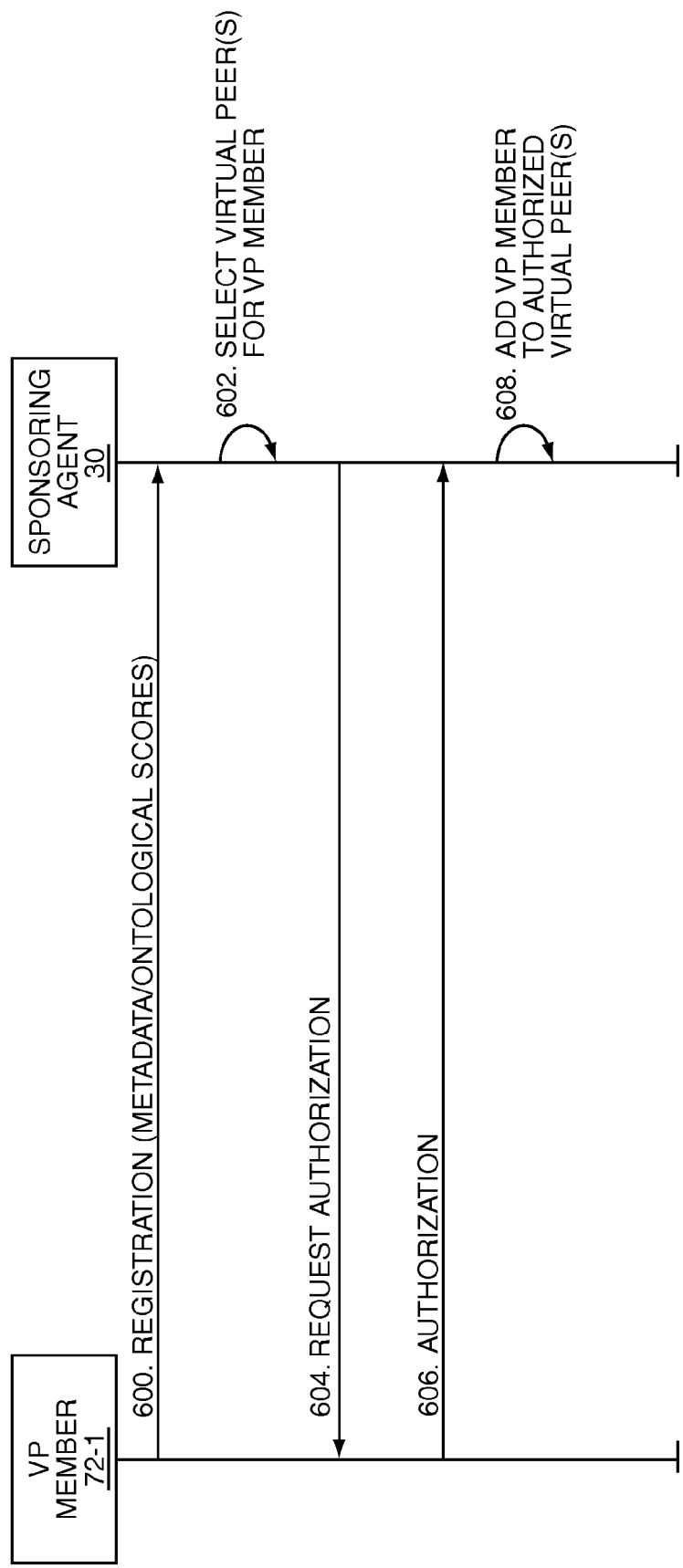
FIG. 9 illustrates the operation of the sponsoring agent of FIG. 7 to form virtual peers based on metadata according to one embodiment of the present invention.

FIG. 9 illustrates the operation of the sponsoring agent 30 of FIG. 7 according to one embodiment of the present invention. This example focuses on the VP member 72-1. However, this discussion is equally applicable to the other VP members 72-2 through 72-M. Note that, as discussed above, the VP member 72-1 is referred to as a potential VP member until registration with authorized virtual peers is complete. First, the potential VP member 72-1 registers with the sponsoring agent 30 (step 600). During registration, the potential VP member 72-1 provides metadata to the sponsoring agent 30. The metadata may be provided as, for example, an Extensible Markup Language (XML) file. FIGS. 10A and 10B illustrate an exemplary metadata. As discussed above, the metadata may include metadata describing the user or owner of the potential VP member 72-1 including, for example, hobbies and interests of the user or owner of the potential VP member 72-1; metadata describing the digital assets or content hosted by the potential VP member 72-1; metadata describing the potential VP member 72-1 such as the capabilities of the potential VP member 72-1; or any combination thereof.

Returning to FIG. 9, rather than providing the metadata to the sponsoring agent 30, the potential VP member 72-1 may alternatively provide ontological scores for one or more of a content ontology, a user ontology, and a device capability ontology, where the ontological scores and ontologies are descriptive of the metadata of the potential VP member 72-1.

Next, based on a comparison of the selection criteria for the virtual peers 70-1 through 70-N and the metadata or ontological scores for the potential VP member 72-1, the sponsoring agent 30 selects one or more of the virtual peers 70-1 through 70-N to which the potential VP member 72-1 may be added (step 602). Exemplary selection criteria may include: the potential VP member 72-1 must be part of the "Flashpoint" network and host five or more shared digital assets with metadata containing the words "Star Trek" or "Trek"; 5% of the digital assets hosted by the VP member 72-1 must have metadata containing the words "Star Trek" or "Trek"; the potential VP member 72-1 must host digital assets having metadata containing the words "Star Trek" or "Trek" and that are unique or not already hosted by the virtual peer; the potential VP member 72-1 must host digital assets having metadata containing the words "Star Trek" or "Trek" and the sum of the file sizes of all of the digital assets hosted by the virtual peer having metadata containing the words "Star Trek" or "Trek" is less than a threshold such as 100 GB; the potential VP member 72-1 must host digital assets having metadata containing "Warcraft" and must not be a member of a "Runescape" virtual peer; or the potential VP member 72-1 must host digital assets having metadata containing "Warcraft" and the owner or user of the potential VP member 72-1 is a premium user and the throughput history of the potential VP member 72-1 is greater than 50 kbps. Again, these selection criteria are exemplary and are not intended to limit the scope of the present invention. Further, the selection criteria may include various statistical criteria such as average or mean value; subscription criteria such as premium, regular, or free; or historical information such as the reliability of the potential VP member 72-1, the usage of the potential VP member 72-1, or contributions of the potential VP member 72-1. The selection criteria may also include content specific criteria regarding any content metadata such as, for example, encoding rate, quality, rating, user that submitted the content, resolution, audio quality, and the like.

Once the sponsoring agent 30 has selected virtual peers for the potential VP member 72-1, the sponsoring agent 30 then sends a request to the potential VP member 72-1 for authorization to add the potential VP member 72-1 to the selected virtual peers (step 604). Note, however, that authorization is optional. The potential VP member 72-1 then returns authorization to be added to one or more of the selected virtual peers (step 606). In response, the sponsoring agent 30 adds the potential VP member 72-1 to the authorized virtual peers (step 608). At this point, the potential VP member 72-1 is a VP member 72-1 of the authorized virtual peers.

Regarding authorization, the user or owner of the potential VP member 72-1 may manually select whether the potential VP member 72-1 is authorized to join each of the selected virtual peers. In order reduce the burden on the user or owner, either the potential VP member 72-1 or the sponsoring agent 30 may maintain an authorization history for the potential VP member 72-1, where the authorization history is a record of virtual peers that the potential VP member 72-1 has previously been authorized to join and virtual peers that the potential VP member 72-1 has not been authorized to join. As a note, an authorization history for the virtual peers 70-1 through 70-N may be used to assign priorities for the virtual peers 70-1 through 70-N. Based on the authorization history, the potential VP member 72-1 or the sponsoring agent 30 may suggest whether or not the potential VP member 72-1 should be authorized to join particular virtual peers or automatically authorize the addition of the potential VP member 72-1 to virtual peers. In addition or alternatively, the user or owner of the potential VP member 72-1 may define one or more rules to be used by the potential VP member 72-1 or the sponsoring agent 30 to determine whether the potential VP member 72-1 is authorized to join the selected virtual peers. For example, authorization rules may be defined such that membership in virtual peers exclusively or primarily sharing video content is automatically authorized, membership in virtual peers exclusively or primarily sharing Jazz or Rock music is automatically authorized, membership in virtual peers not sharing a particular digital asset are automatically rejected, and membership in virtual peers having content metadata including the word "Manilow" is automatically authorized.

Figure 11:
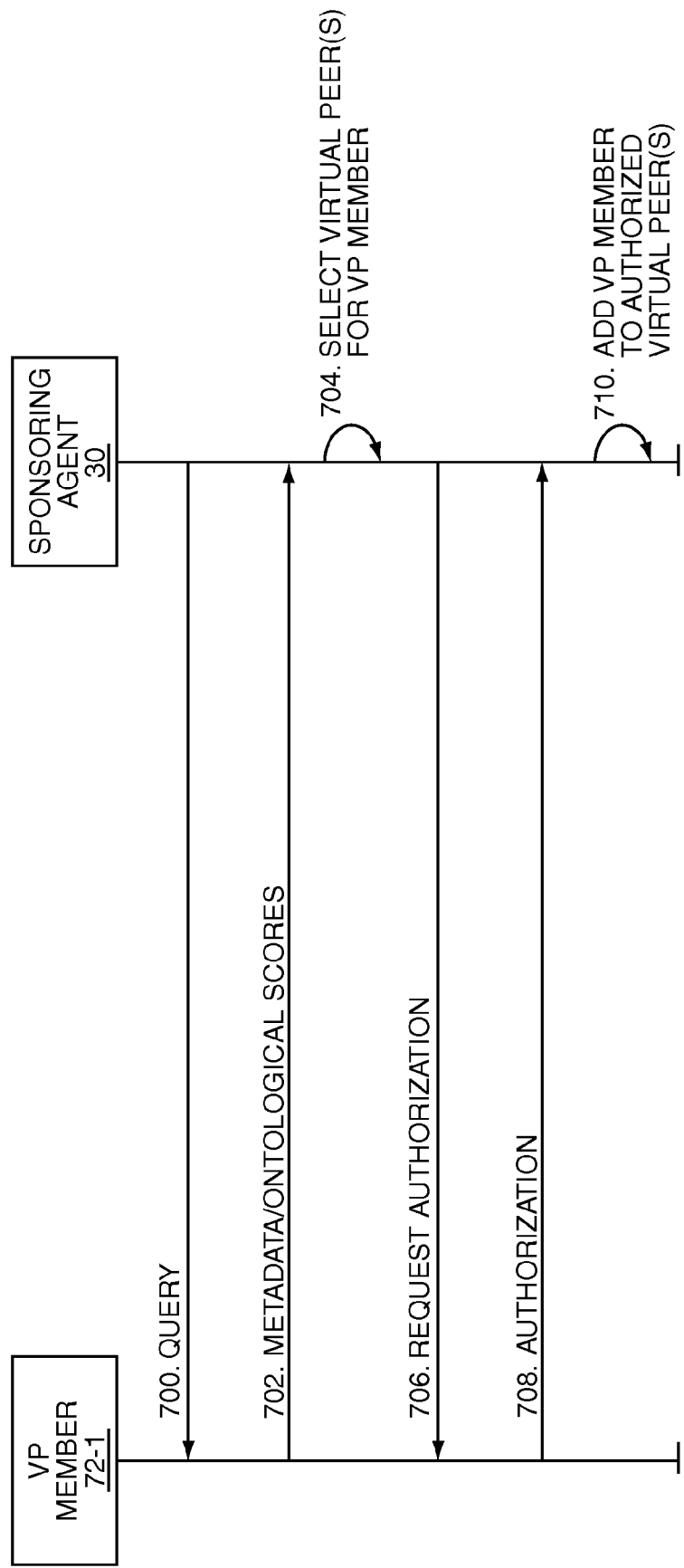
FIG. 11 illustrates the operation of the sponsoring agent of FIG. 7 to form virtual peers based on metadata according to another embodiment of the present invention.

FIG. 11 illustrates the operation of the sponsoring agent 30 of FIG. 7 according to a second embodiment of the present invention. This example focuses on the VP member 72-1. However, this discussion is equally applicable to the other VP members 72-2 through 72-M. Again, note that, as discussed above, the VP member 72-1 is referred to as a potential VP member until registration with authorized virtual peers complete. First, the sponsoring agent 30 queries the potential VP member 72-1 (step 700). Note that the sponsoring agent 30 may provide the query by, for example, querying all or at least a portion of the peer nodes in the P2P network. In response, the potential VP member 72-1 provides metadata or ontological scores (step 702). As discussed above, the metadata may include metadata describing the user or owner of the potential VP member 72-1 including, for example, hobbies and interests of the user or owner of the potential VP member 72-1; metadata describing the digital assets or content hosted by the potential VP member 72-1; metadata describing the potential VP member 72-1 such as the capabilities of the potential VP member 72-1; or any combination thereof. Alternatively, the potential VP member 72-1 may provide ontological scores for one or more of a content ontology, a user ontology, and a device capability ontology, where the ontological scores and ontologies are descriptive of the metadata of the potential VP member 72-1.

Next, based on a comparison of the selection criteria for the virtual peers 70-1 through 70-N and the metadata or ontological scores for the potential VP member 72-1, the sponsoring agent 30 selects one or more of the virtual peers 70-1 through 70-N to which the potential VP member 72-1 may be added (step 704). In this example, the sponsoring agent 30 then sends a request to the potential VP member 72-1 for authorization to add the potential VP member 72-1 to the selected virtual peers (step 706). Note, however, that authorization is optional. The potential VP member 72-1 then returns authorization to join one or more of the selected virtual peers (step 708). In response, the sponsoring agent 30 adds the potential VP member 72-1 to the authorized virtual peers (step 710). At this point, the potential VP member 72-1 is a VP member 72-1 of the authorized virtual peers.

While the registration model of FIG. 9 and the query model of FIG. 11 have been discussed separately, the sponsoring agent 30 may use both of these models. More specifically, for ones of the potential VP members 72-1 through 72-M having knowledge of the sponsoring agent 30, the registration model may be used. For others of the potential VP members 72-1 through 72-M, the query model may be used.

In an alternative embodiment, the sponsoring agent 30 may identify VP members for a virtual peer using, for example, a content discovery request in a P2P network. The content discovery request may include keywords corresponding to the selection criteria for the virtual peer. Based on the responses to the content discovery request from nodes in the P2P network, the sponsoring agent 30 may identify ones of the nodes as VP members for the virtual peer. Note that in this alternative embodiment, the sponsoring agent 30 may automatically add the nodes as VP members. Further, the nodes may be unaware that they are VP members of the virtual peer.

Figure 12:
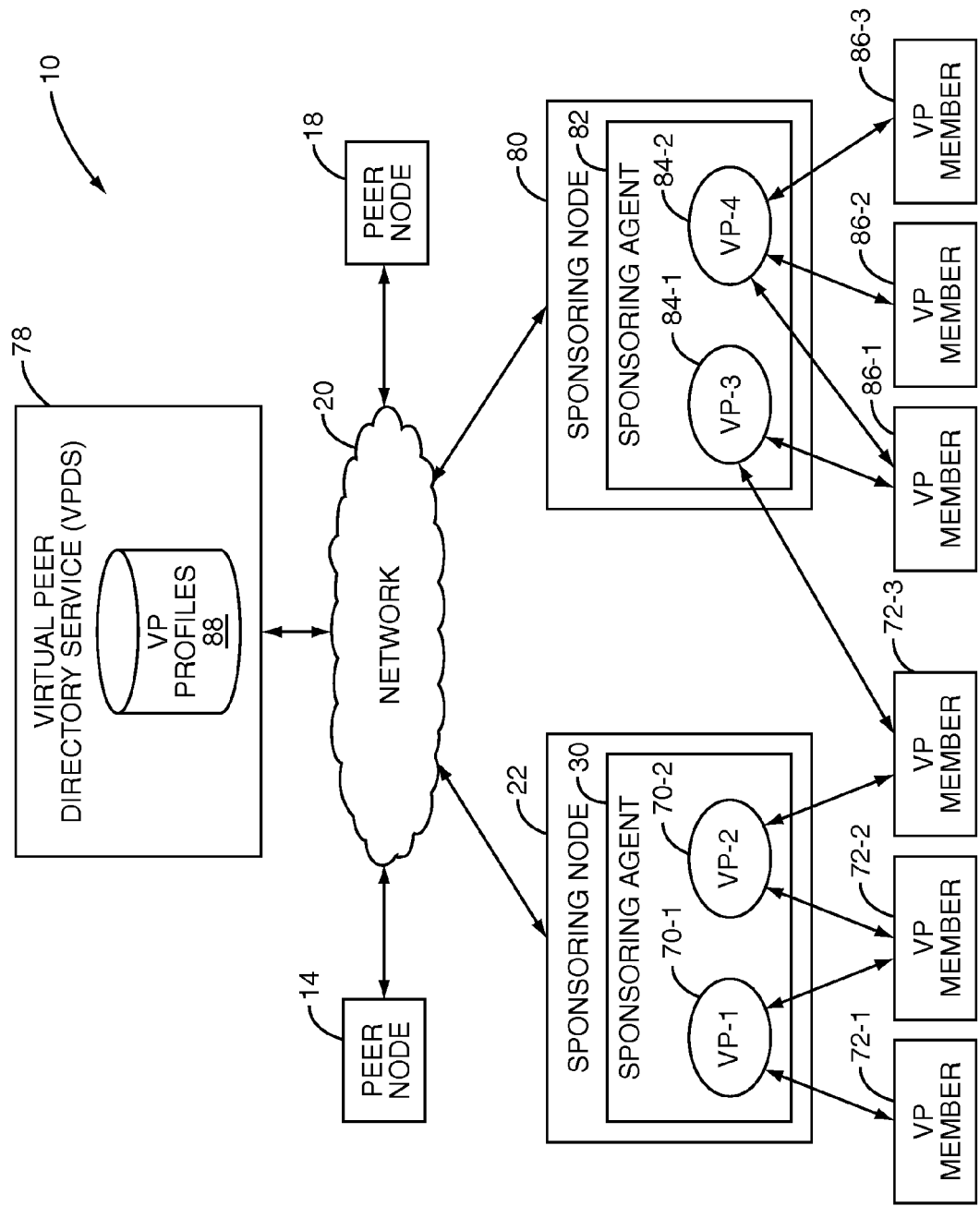
FIG. 12 illustrates a system including a virtual peer directory service (VPDS) for forming virtual peers based on metadata according to one embodiment of the present invention.

FIG. 12 is similar to FIG. 7. However, in this embodiment, a virtual peer directory service (VPDS) 78 operates to identify or select virtual peers for potential VP members. The VPDS 78 may be hosted by a central server. Alternatively, the VPDS 78 may be distributed on a number of distributed systems or distributed on a P2P network. More specifically, in this embodiment, the system 10 includes the sponsoring node 22 hosting the sponsoring agent 30. The sponsoring agent 30 hosts virtual peers 70-1 and 70-2. In this example, the virtual peer 70-1 includes VP members 72-1 and 72-2, and the virtual peer 70-2 includes the VP members 72-2 and 72-3. In addition, the system 10 includes a sponsoring node 80 hosting a sponsoring agent 82. The sponsoring agent 82 hosts virtual peers 84-1 and 84-2. In this example, the virtual peer 84-1 includes VP members 72-3 and 86-1, and the virtual peer 84-2 includes VP members 86-1, 86-2, and 86-3. Note that while two sponsoring agents 30 and 82 are illustrated for clarity and ease of discussion, the present invention is not limited thereto. The system 10 may include any number of sponsoring nodes and sponsoring agents. Likewise, while each the sponsoring agents 30, 82 hosts two virtual peers 70-1, 70-2 and 84-1, 84-2, each of the sponsoring agents 30, 82 may host any number of virtual peers. The VP members 72-1 through 72-3 and 86-1 through 86-3 may be peer nodes in the P2P network, independent user devices, other virtual peers, or the like.

In general, the VPDS 78 maintains a VP profiles database 88 including selection criteria for each of the virtual peers 70-1, 70-2, 84-1, and 84-2 hosted by the sponsoring agents 30 and 82. In addition, the VP profiles database 88 may include information describing the virtual peers 70-1, 70-2, 84-1, and 84-2; current load conditions of the virtual peers 70-1, 70-2, 84-1, and 84-2; and capabilities of the sponsoring nodes 22 and 80 such as processor speed, amount of memory, storage capacity, network connection speed, or the like. As discussed below, in operation, the VPDS 78 operates to select virtual peers for the potential VP members 72-1 through 72-3 and 86-1 through 86-3. In addition, as conditions such as the selection criteria for the virtual peers change, the VPDS 78 may reassign the VP members 72-1 through 72-3 and 86-1 through 86-3 to the virtual peers.

Note that while not illustrated in FIG. 12, the VP members 72-1 through 72-3 and 86-1 through 86-3 have access to the VPDS 88 via the network 20 both before and after being registered with ones of the virtual peers 70-1, 70-2, 84-1, and 84-2. Thus, in this embodiment, the VP members 72-1 through 72-3 and 86-1 through 86-3 include, for example, a wired network interface, a local wireless network interface, a cellular interface, or the like for connecting to the network 20.

Figure 13:
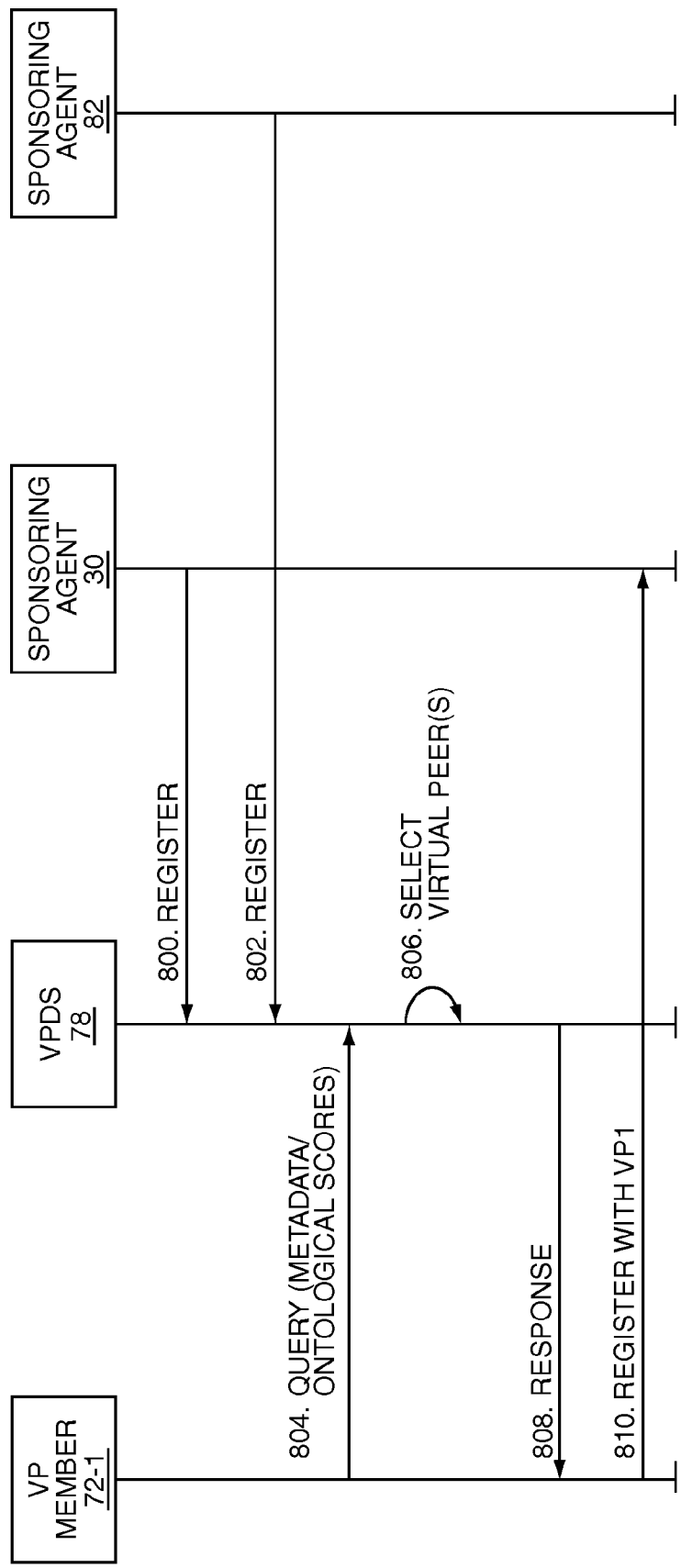
FIG. 13 illustrates the operation of the VPDS of FIG. 12 according to one embodiment of the present invention.

FIG. 13 illustrates the operation of the system 10 of FIG. 12 according to one embodiment of the present invention. First, the sponsoring agents 30 and 82 register with the VPDS 78 (steps 800 and 802). During registration, the sponsoring agents 30 and 82 provide VP profiles for the virtual peers 70-1, 70-2, 84-1, and 84-2 hosted by the sponsoring agents 30 and 82 to the VPDS 78 where the VP profiles are stored in the VP profiles database 88. While registration is illustrated as a single step for each of the sponsoring agents 30 and 82, the sponsoring agents 30 and 82 may thereafter operate to update the VP profiles, add new VP profiles if new virtual peers are created, or delete VP profiles if an existing virtual peer is deactivated or terminated. Alternatively, the VPDS 78 may use a querying process to discover the sponsoring agents 30 and 82 and the virtual peers 70-1, 70-2, 84-1, and 84-2 hosted by the sponsoring agents 30 and 82.

In this example, the potential VP member 72-1 then queries the VPDS 78 for virtual peers that the potential VP member 72-1 is qualified to join (step 804). Note that this discussion is equally applicable to any of the potential VP members 72-1 through 72-3 and 86-1 through 86-3. The query includes metadata for the potential VP member 72-1 or ontological scores describing the metadata for the potential VP member 72-1. As discussed above, the metadata for the potential VP member 72-1 may include user metadata, content metadata, VP member metadata, or the like. Note that VP member metadata may include device metadata for the potential VP member 72-1. In addition, if the potential VP member 72-1 is another virtual peer, the VP member metadata may include device metadata for the sponsoring node and metadata regarding the associated VP members. In response, the VPDS 78 selects one or more of the virtual peers 70-1, 70-2, 84-1, and 84-2 hosted by the sponsoring agents 30 and 82 that the potential VP member 72-1 is qualified to join by comparing the metadata or ontological scores for the potential VP member 72-1 to the selection criteria for the virtual peers 70-1, 70-2, 84-1, and 84-2 stored in the VP profiles database 88 (step 806).

In this embodiment, the VPDS 78 then sends a response to the potential VP member 72-1 identifying the selected virtual peers, which in this example is the virtual peer 70-1 (step 808). Generally, the response includes information enabling the potential VP member 72-1 to contact the sponsoring agent 30 and join the virtual peer 70-1. For example, the response may include a URL of the sponsoring node 30, a peer ID of the virtual peer 70-1, and credentials such as a token indicating that the potential VP member 72-1 has been directed to the virtual peer 70-1 by the VPDS 78. In addition, the response may include information describing the virtual peer 70-1, which may be viewed by the user or owner of the potential VP member 72-1 to decide whether to join the virtual peer 70-1. The potential VP member 72-1 then connects to the sponsoring agent 30 and registers with the virtual peer 70-1 (step 810). At this point the potential VP member 72-1 is registered as a VP member of the virtual peer 70-1.

In a similar fashion, the potential VP members 72-2, 72-3, and 86-1 through 86-3 may use the VPDS 78 to identify and register with the corresponding ones of the virtual peers 70-1, 70-2, 84-1, and 84-2.

Figure 14:
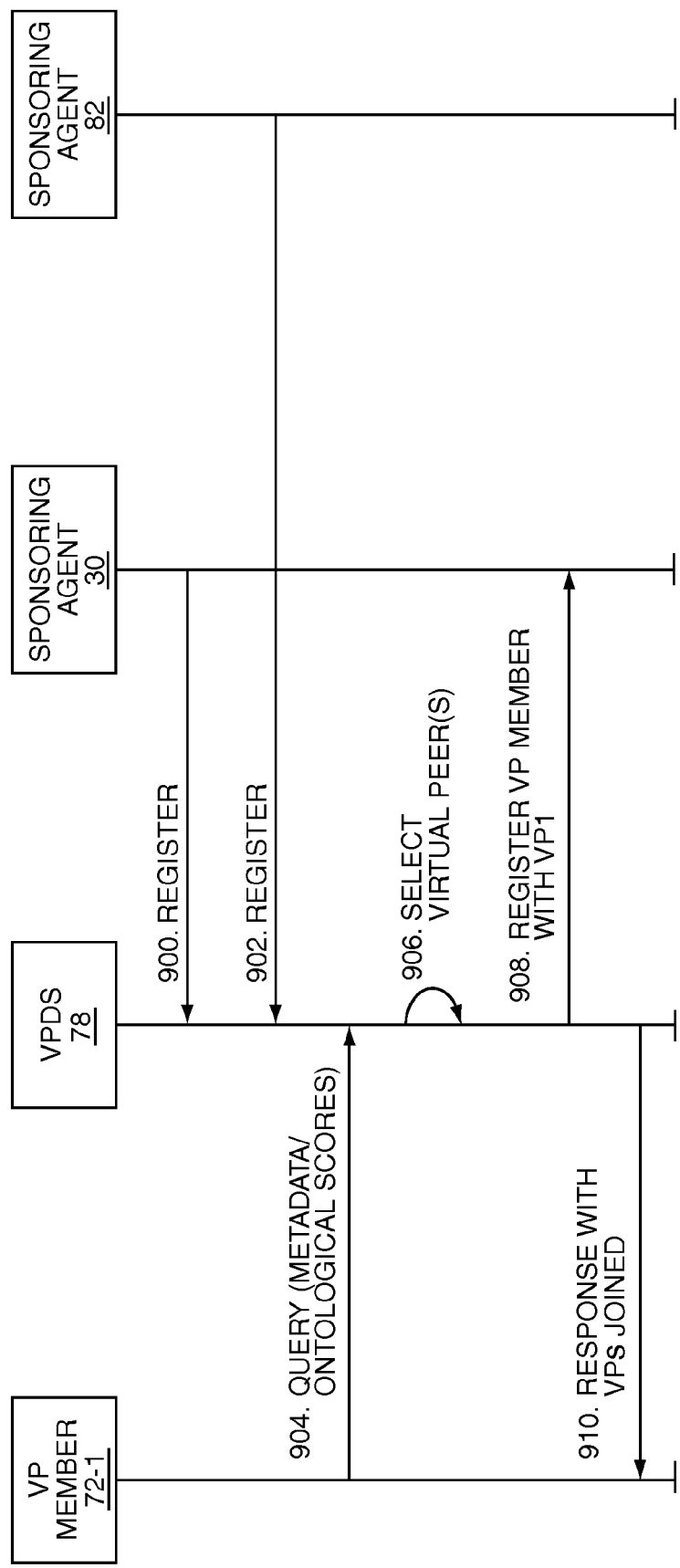
FIG. 14 illustrates the operation of the VPDS of FIG. 12 according to another embodiment of the present invention.

FIG. 14 illustrates the operation of the system 10 of FIG. 12 according to another embodiment of the present invention. This embodiment is substantially the same as that described with respect to FIG. 13. However, the VPDS 78 operates to automatically register the potential VP member 72-1 with the selected virtual peers.

More specifically, the sponsoring agents 30 and 82 register with the VPDS 78 (steps 900 and 902). During registration, the sponsoring agents 30 and 82 provide VP profiles for the virtual peers 70-1, 70-2, 84-1, and 84-2 hosted by the sponsoring agents 30 and 82 to the VPDS 78 where the VP profiles are stored in the VP profiles database 88. While registration is illustrated as a single step for each of the sponsoring agents 30 and 82, the sponsoring agents 30 and 82 may thereafter operate to update the VP profiles, add new VP profiles if new virtual peers are created, or delete VP profiles if an existing virtual peer is deactivated or terminated. In an alternative embodiment, the VPDS 78 may identify the sponsoring agents 30 and 82 using a query process.

In this example, the potential VP member 72-1 then queries the VPDS 78 for virtual peers that the potential VP member 72-1 is qualified to join (step 904). Note that this discussion is equally applicable to any of the potential VP members 72-1 through 72-3 and 86-1 through 86-3. The query includes metadata for the potential VP member 72-1 or ontological scores describing the metadata for the potential VP member 72-1. As discussed above, the metadata for the potential VP member 72-1 may include user metadata, content metadata, VP member metadata, or the like. In response, the VPDS 78 selects one or more of the virtual peers 70-1, 70-2, 84-1, and 84-2 hosted by the sponsoring agents 30 and 82 that the potential VP member 72-1 is qualified to join by comparing the metadata or ontological scores for the potential VP member 72-1 to the selection criteria for the virtual peers 70-1, 70-2, 84-1, and 84-2 stored in the VP profiles database 88 (step 906). In this example, the selected virtual peer is the virtual peer 70-1.

In this embodiment, the VPDS 78 then communicates with the sponsoring agent 30 to register the potential VP member 72-1 with the virtual peer 70-1 (step 908). At this point the VP member 72-1 is registered as a VP member of the virtual peer 70-1. Once registration is complete, the VPDS 78 sends a response to the VP member 72-1 identifying the virtual peer 70-1 with which the VP member 72-1 is registered and information, such as a URL, enabling the VP member 72-1 to establish a connection with the sponsoring agent 30 (step 910). Alternatively, the sponsoring agent 30 may provide the response to the VP member 72-1. In a similar fashion, the potential VP members 72-2, 72-3, and 86-1 through 86-3 may use the VPDS 78 to identify and register with the corresponding ones of the virtual peers 70-1, 70-2, 84-1, and 84-2. Note that authorization from the user of the potential VP member 72-1 may be sought before registering the potential VP member 72-1 with the virtual peer 70-1.

Figure 15:
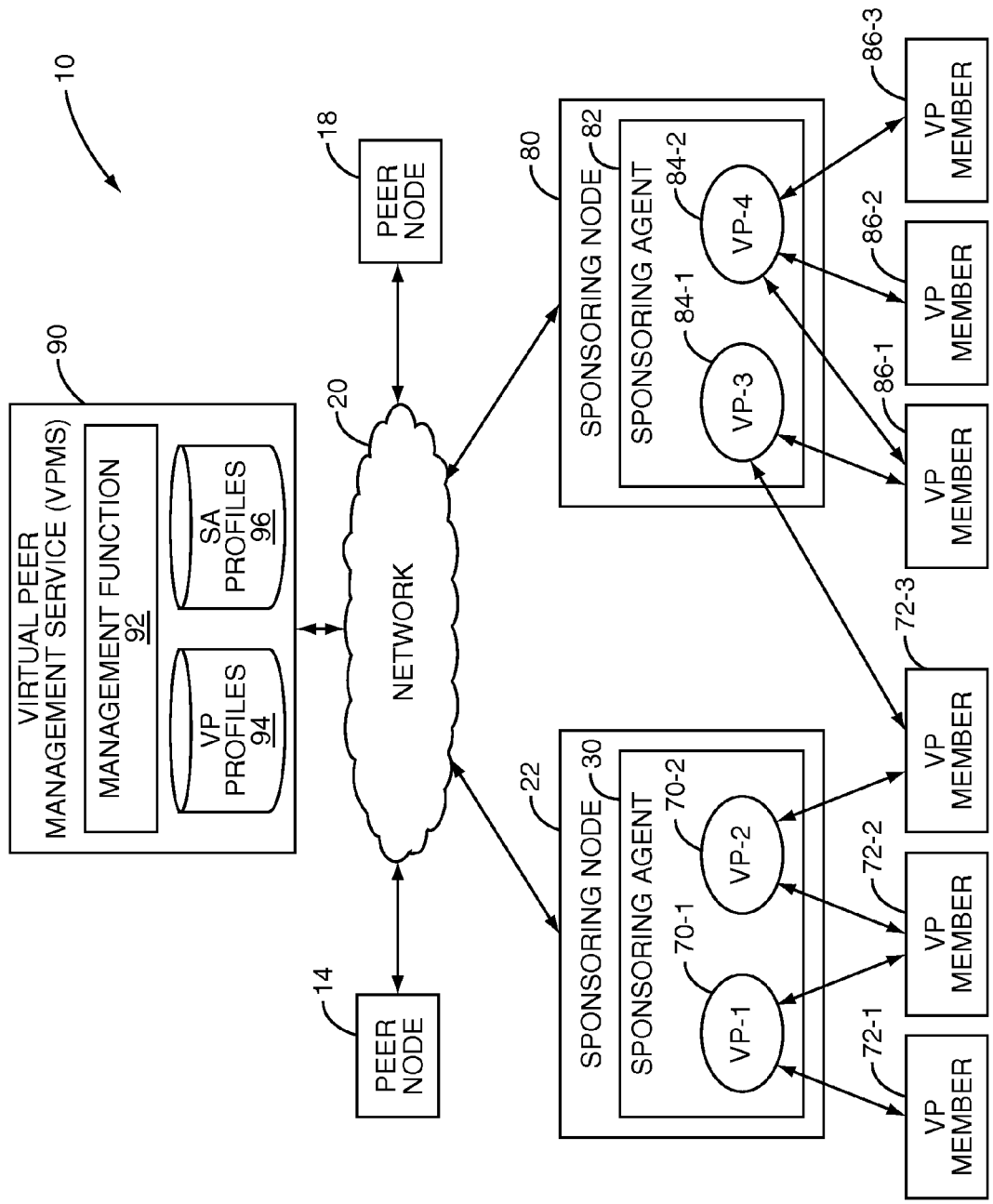
FIG. 15 illustrates a system including a virtual peer management service (VPMS) for forming and managing virtual peers based on metadata according to one embodiment of the present invention.

FIG. 15 illustrates another embodiment of the system 10 wherein a virtual peer management service (VPMS) 90 operates to provide a directory service like that discussed above with respect to FIGS. 12-14 and a management function. The VPMS 90 may be hosted by a central server. Note that the VPMS 90, while shown as a single service, may alternatively be implemented as a directory service and a management service.

The VPMS 90 includes a management function 92, a VP profiles database 94, and a sponsoring agent (SA) profiles database 96. In general, the VP profiles database 94 stores profiles of a number of virtual peers such as the virtual peers 70-1, 70-2, 84-1, and 84-2, which, as discussed above, may be system or user defined. A profile of a virtual peer may include information such as the selection criteria for the virtual peer, a description of the virtual peer, management rules for the virtual peer, access control rules for the virtual peer, and the like. The SA profiles database 96 stores profiles for the sponsoring agents 30 and 82 in the system 10. A SA profile may include information identifying the capabilities such as processor, memory, storage, and network connection speed and information identifying the current load conditions of the sponsoring agent, the average or historical throughput of the sponsoring agent, or the like.

The management function 92, which may be implemented in software, operates to assign virtual peers to the sponsoring agents 30 and 82. Thereafter, the management function 92 monitors the sponsoring agents 30 and 82 and the virtual peers 70-1, 70-2, 84-1, and 84-2 and may reallocate the virtual peers 70-1, 70-2, 84-1, and 84-2 among the sponsoring agents 30 and 82 to provide efficient operation. The management function 92 may manage the sponsoring agents 30 and 82 and the virtual peers 70-1, 70-2, 84-1, and 84-2 to provide services such as load balancing, redundancy, and failover. In addition, the management function 92 may use an ontology to dynamically control the activation and deactivation of virtual peers to achieve a desired membership density in a manner similar to that described above. Still further, the management function 92 may partition existing virtual peers into a number of nested virtual peers hosted by multiple nodes to partition the workload associated with the virtual peer. For example, if the sponsoring node 22 is a high-powered node and the sponsoring node 80 is a low-powered node and the membership of the virtual peer 84-1 increases dramatically or increases above a predetermined threshold, the management function 92 may operate to reallocate the virtual peer 84-1 to the sponsoring agent 30. As another example, if the sponsoring agent 82 is being overloaded by the virtual peer 84-2, the management function 92 may partition the virtual peer 84-2 into two or more nested virtual peers hosted by two or more sponsoring agents. Further, one or more of the VP members 86-1 through 86-3 of the virtual peer 84-2 may be converted to a sponsoring node for the one or more of the nested virtual peers.

Figure 16:
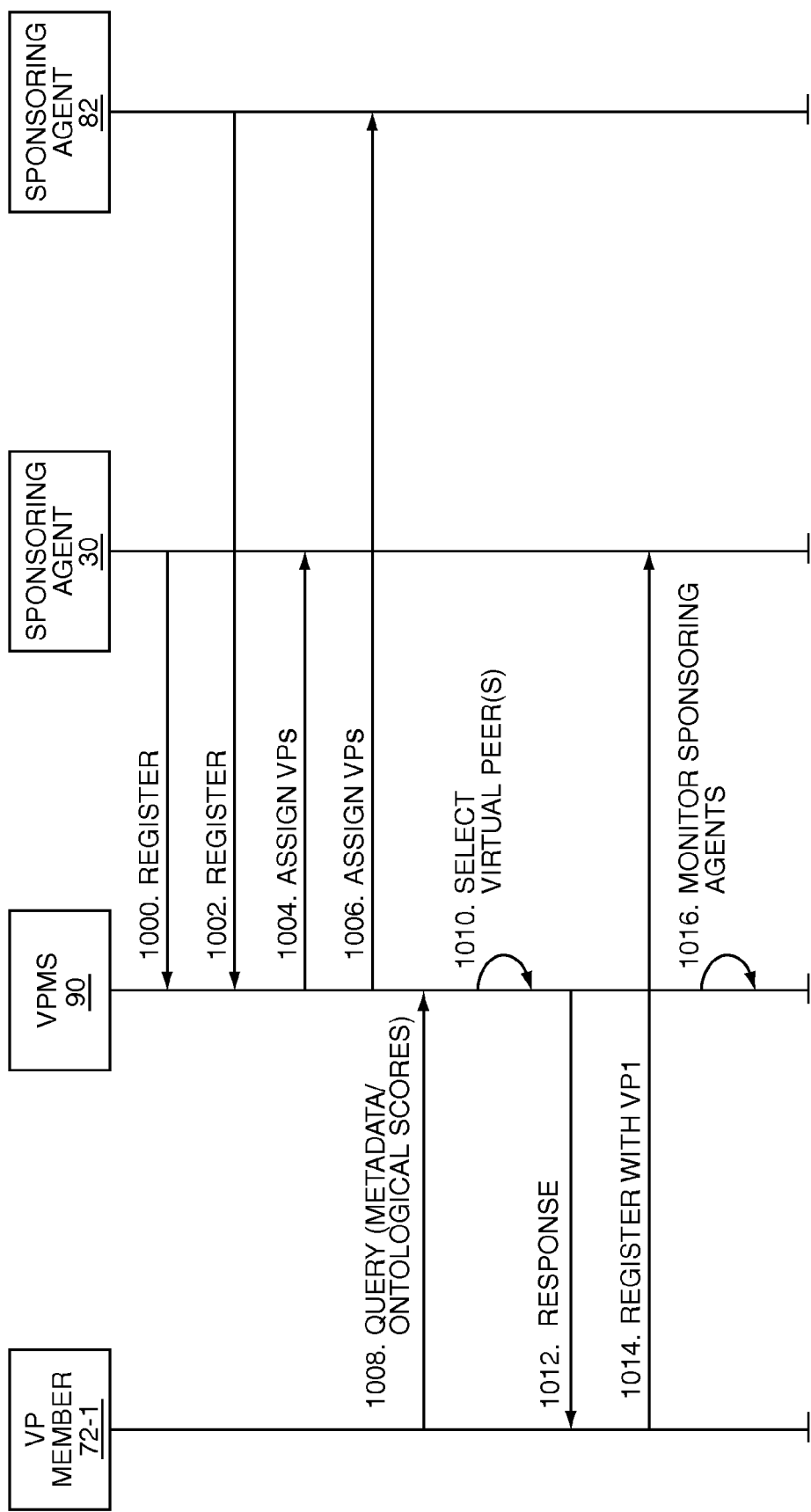
FIG. 16 illustrates the operation of the VPMS of FIG. 15 according to one embodiment of the present invention.

FIG. 16 illustrates the operation of the system 10 of FIG. 15 according to one embodiment of the present invention. First, the sponsoring agents 30 and 82 register with the VPMS 90 (steps 1000 and 1002). During registration, the sponsoring agents 30 and 82 provide the capabilities of the sponsoring nodes 22 and 80, which are stored in the SA profiles database 96. In addition, the sponsoring agents 30 and 82 may provide information identifying current load conditions at the sponsoring agents 30 and 82, the average or historical throughput of the sponsoring agents 30 and 82, or the like. While not illustrated, the sponsoring agents 30 and 82 may thereafter provide updates to the VPMS 90 as the conditions or status of the sponsoring agents 30 and 82 change. In an alternative embodiment, the VPMS 90 may discover the sponsoring agents 30 and 82 using a query process.

The VPMS 90 then assigns virtual peers to the sponsoring agents 30 and 82 (steps 1004 and 1006). In this example, the VPMS 90 assigns the virtual peers 70-1 and 70-2 to the sponsoring agent 30 and the virtual peers 84-1 and 84-2 to the sponsoring agent 82.

Thereafter, the VPMS 90 may receive a query from, for example, the potential VP member 72-1 to identify virtual peers for the potential VP member 72-1 (step 1008). The query may include metadata or ontological scores describing the metadata for the potential VP member 72-1. In response, the VPMS 90 selects one or more virtual peers for the potential VP member 72-1 by comparing the metadata or ontological scores for the potential VP member 72-1 to the selection criteria of the virtual peers defined in the VP profiles database 94 (step 1010). In this example, virtual peer 70-1 is selected for the potential VP member 72-1. The VPMS 90 then sends a response identifying the virtual peer 70-1 and the sponsoring agent 30 to the potential VP member 72-1 (step 1012). The potential VP member 72-1 then connects to the sponsoring agent 30 and registers with the virtual peer 70-1 (step 1014). Alternatively, the VPMS 90 may automatically register the VP member 72-1 with the virtual peer 70-1. As another alternative, the VPMS 90 may notify the sponsoring agent 30 of the potential VP member 72-1, and the sponsoring agent 30 may communicate with the potential VP member 72-1 to register the potential VP member 72-1 with the virtual peer 70-1. Once registration is complete, the potential VP member 72-1 is a VP member of the virtual peer 70-1.

In addition to providing the directory service of steps 1008-1012, the VPMS 90 operates to monitor the sponsoring agents 30 and 82 and the virtual peers 70-1, 70-2, 84-1, and 84-2 hosted by the sponsoring agents 30 and 82 (step 1016). While illustrated as a single step, the monitoring process may be a continual process. Based on the status of the virtual peers 70-1, 70-2, 84-1, and 84-2 and the sponsoring agents 30 and 82, the VPMS 90 may perform various management functions. Note that the status of the virtual peers 70-1, 70-2, 84-1, and 84-2 may be, for example, the number of virtual peer members for each of the virtual peers 70-1, 70-2, 84-1, and 84-2. The status of the sponsoring agents 30 and 82 may be, for example, the capabilities and conditions of the sponsoring nodes 22 and 80, amount of content hosted by the virtual peers hosted by the sponsoring nodes 22 and 80, traffic conditions, number of requests pending, current load conditions, memory usage, CPU utilization, bandwidth being used, and the like. As examples of the monitoring and management process of the VPMS 90, the VPMS 90 may reallocate the virtual peers 70-1, 70-2, 84-1, and 84-2 among the sponsoring agents 30 and 82, assign new virtual peers to the sponsoring agents 30 and 82; partition virtual peers into nested virtual peers based on, for example, an ontology; combine nested virtual peers into a single virtual peer based on, for example, an ontology; or the like.

Figure 17:
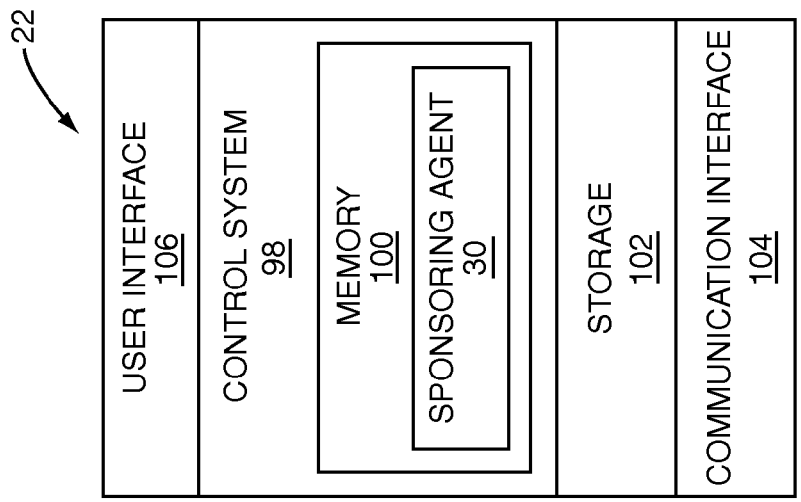
FIG. 17 illustrates an exemplary embodiment of a sponsoring node.

FIG. 17 is a block diagram on an exemplary embodiment of the sponsoring node 22. In general, the sponsoring node 22 includes a control system 98 having associated memory 100. In this example, the sponsoring agent 30 is implemented in software and stored in the memory 100. The sponsoring agent 22 may also include one or more digital storage devices 102. The sponsoring node 22 also includes a communication interface 104 communicatively coupling the sponsoring node 22 to the network 20. Further, if one or more of the VP members 24-28 or 72-1 through 72-M is connected to the sponsoring node 22 via a direct wired connection or a local wireless connection, the communication interface 104 may include a wired communication interface and/or a local wireless communication interface. The sponsoring node 22 also includes a user interface 106, which may include components such as, for example, a display, speakers, user input devices such as a keyboard and mouse, or the like.

Figure 18:
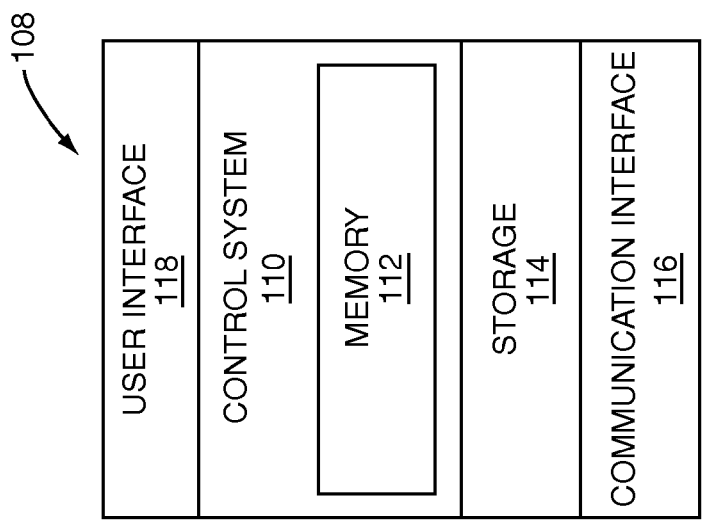
FIG. 18 illustrates an exemplary embodiment of a central server hosting the VPDS of FIGS. 12-14 according to one embodiment of the present invention.

FIG. 18 illustrates an exemplary embodiment of a server 108 hosting the VPDS 78 of FIGS. 12-14. The server 108 includes a control system 110 having associated memory 112. In one embodiment, the VPDS 78 may be implemented in software and stored in the memory 112. The server 108 also includes one or more digital storage devices 114, which may be used to store the VP profiles database 88. The server 108 also includes a communication interface 116 communicatively coupling the server 108 to the network 20. The server 108 may also include a user interface 118, which may include components such as, for example, a display, speakers, user input devices such as a keyboard and mouse, or the like.

Figure 19:
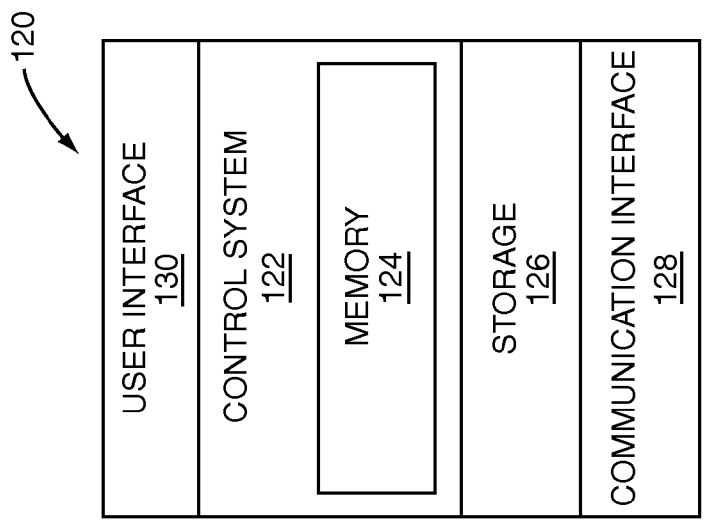
FIG. 19 illustrates an exemplary embodiment of a central server hosting the VPMS of FIGS. 15-16 according to one embodiment of the present invention.

FIG. 19 illustrates an exemplary embodiment of a server 120 hosting the VPMS 90 of FIGS. 15-16. The server 120 includes a control system 122 having associated memory 124. In one embodiment, the VPMS 90 may be implemented in software and stored in the memory 124. The server 120 also includes one or more digital storage devices 126, which may be used to store the VP profiles database 94 and the SA profile database 96. The server 120 also includes a communication interface 128 communicatively coupling the server 120 to the network 20. The server 104 may also include a user interface 130, which may include components such as, for example, a display, speakers, user input devices such as a keyboard and mouse, or the like.

The present invention provides substantial opportunity for variation without departing from the spirit or scope of the present invention. For example, while the sponsoring agent 30 is illustrated and described above as being hosted by the sponsoring node 22, the present invention is not limited thereto. More specifically, in an alternative embodiment, the sponsoring agent 30 may be implemented on all or a number of the VP members 24-28 of the virtual peer 12 where one of the VP members 24-28 is selected as a VP leader at any given time. The VP leader may then operate as the communication end-point for the virtual peer 12 in much the same manner as the sponsoring node 22 in the description above. As another example, the sponsoring agent 30 may enable the virtual peer 12 to be addressable in other communication networks. For example, the sponsoring agent 30 may register the virtual peer 12 with an Internet Domain Name Server (DNS) and thereafter act as a bridge between the Internet and the VP members 24-28.

Regarding mobile devices, a VP member such as the VP member 24 may dynamically create and maintain a new virtual peer in response to detecting mobile devices within its local wireless coverage area that desire to join the existing virtual peer. For example, if the VP member 24 is a personal computer having a local wireless communication interface, the VP member 24 may detect one or more mobile devices in its local wireless coverage area. If the mobile devices desire to join the virtual peer 12 and are authorized to do so, the VP member 24 may create and maintain a new virtual peer as a member of the virtual peer 12 where the mobile devices are the members of the new virtual peer.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   registering, by a sponsoring agent, a virtual peer including a plurality of virtual peer members with a peer-to-peer (P2P) network such that the virtual peer is established as a peer in the P2P network, wherein each of the plurality of virtual peer members is communicatively coupled to the sponsoring agent;
   receiving, from a device other than one of the plurality of virtual peer members, an incoming message on behalf of the virtual peer at the sponsoring agent operating as a communication end-point for the virtual peer in the P2P network;
   sending, by the sponsoring agent, the incoming message to at least one of the plurality of virtual peer members; and
   effecting by-passing of the sponsoring agent for an outgoing message from the at least one of the plurality of virtual peer members to a desired recipient by:
      providing virtual peer credentials to the at least one of the plurality of virtual peer members to be used when providing an outgoing message to a desired recipient, wherein when the at least one of the plurality of virtual peer members provides the outgoing message to the desired recipient using the virtual peer credentials, the outgoing message appears to the desired recipient to have been provided by the virtual peer rather than the at least one of the plurality of virtual peer members.

2. The method of claim 1 further comprising:
   identifying the plurality of virtual peer members; and
   registering the plurality of virtual peer members as members of the virtual peer.

3. The method of claim 2 wherein identifying the plurality of virtual peer members comprises:
   receiving requests to join the virtual peer from a plurality of potential virtual peer members; and
   determining whether to add each of the plurality of potential virtual peer members to the virtual peer, wherein the ones of the plurality of virtual peer members added to the virtual peer are the plurality of virtual peer members.

4. The method of claim 3 wherein the requests include information identifying owners of the plurality of potential virtual peer members, and determining whether to add each of the plurality of virtual peer members to the virtual peer comprises determining whether the owner of each of the plurality of virtual peer members is one of at least one owner authorized to join the virtual peer.

5. The method of claim 2 wherein identifying the plurality of virtual peer members comprises querying a plurality of potential virtual peer members to identify the plurality of virtual peer members.

6. The method of claim 1 wherein sending the incoming message to at least one of the plurality of virtual peer members comprises broadcasting the incoming message to the plurality of virtual peer members.

7. The method of claim 1 wherein sending the incoming message to at least one of the plurality of virtual peer members comprises:
   identifying ones of the plurality of virtual peer members to receive the message; and
   multi-casting the incoming message to the ones of the plurality of virtual peer members.

8. The method of claim 1 wherein sending the incoming message to at least one of the plurality of virtual peer members comprises:
   identifying one of the plurality of virtual peer members to receive the message; and
   sending the incoming message to the plurality of virtual peer members.

9. The method of claim 1 further comprising:
   receiving a second incoming message from a peer node at the sponsoring agent on behalf of the virtual peer;
   identifying one of the plurality of virtual peer members to receive the second incoming message; and
   redirecting the peer node to the one of the plurality of virtual peer members.

10. The method of claim 1 further comprising:
    receiving an outgoing message from one of the plurality of virtual peer members;
    processing the outgoing message to convert the outgoing message to an outgoing message originating from the virtual peer; and
    sending the outgoing message originating from the virtual peer to a desired recipient.

11. The method of claim 1 further comprising:
    receiving a request from a peer node at the sponsoring agent on behalf of the virtual peer;
    providing the request to at least one of the plurality of virtual peer members;
    receiving a response from one of the plurality of virtual peer members; and
    providing the response to the peer node.

12. The method of claim 1 further comprising:
    receiving a request from a peer node at the sponsoring agent on behalf of the virtual peer;
    identifying one of the plurality of virtual peer members to serve the request; and
    effecting a connection between the one of the plurality of virtual peer members and the peer node by-passing the sponsoring agent for serving the request.

13. The method of claim 1 further comprising:
    receiving a request from a peer node at the sponsoring agent on behalf of the virtual peer;
    identifying one of the plurality of virtual peer members to serve the request; and
    redirecting the peer node to the one of the plurality of virtual peer members.

14. The method of claim 1 further comprising:
    receiving a request from a peer node at the sponsoring agent on behalf of the virtual peer;
    identifying one of the plurality of virtual peer members to serve the request; and
    directing the one of the plurality of virtual peer members to respond to the request via a connection by-passing the sponsoring agent.

15. The method of claim 1 further comprising:
    receiving a request from a peer node at the sponsoring agent on behalf of the virtual peer;
    identifying, by the sponsoring agent, one of the plurality of virtual peer members to serve the request;
    providing, by the sponsoring agent, virtual peer credentials to the one of the plurality of virtual peer members; and
    directing, by the sponsoring agent, the one of the plurality of virtual peer members to respond to the request on behalf of the virtual peer via a connection by-passing the sponsoring agent;
    wherein when the one of the plurality of virtual peer members generates and provides a response to the peer node using the virtual peer credentials, the response appears to the peer node to have been provided by the virtual peer rather than the one of the plurality of virtual peer members.

16. The method of claim 1 further comprising:
receiving a request for a digital asset from a peer node at the sponsoring agent on behalf of the virtual peer;
identifying at least two of the plurality of virtual peer members hosting the digital asset;
concurrently obtaining segments of the digital asset from the at least two of the plurality of virtual peer members;
combining the segments of the digital asset to provide the digital asset; and
providing a response including the digital asset to the peer node.

17. The method of claim 1 further comprising:
receiving a request for a digital asset from a peer node at the sponsoring agent on behalf of the virtual peer;
identifying at least two of the plurality of virtual peer members hosting the digital asset; and
effecting concurrent transfers of segments of the digital asset from the at least two of the plurality of virtual peer members to the peer node via connections by-passing the sponsoring agent.

18. The method of 1 wherein each of the plurality of virtual peer members is a member selected from a group consisting of: a peer node in the P2P network, another virtual peer, an independent user device, a web server, and a proxy server.

19. The method of claim 1 further comprising establishing communication between the sponsoring agent and the plurality of virtual peer members.

20. The method of claim 1 further comprising establishing communication between the sponsoring agent and the plurality of virtual peer members via the P2P network.

21. The method of claim 1 further comprising establishing communication between the sponsoring agent and the plurality of virtual peer members via the Internet.

22. The method of claim 1 further comprising establishing communication between the sponsoring agent and the at least one virtual peer member via local wireless communication.

23. The method of claim 1 wherein membership of the plurality of virtual peer members in the virtual peer depends on time of day.

24. The method of claim 1 wherein membership of the plurality of virtual peer members in the virtual peer depends on a location of the at least one virtual peer member.

25. A sponsoring node for hosting a virtual peer in a peer-to-peer (P2P) network comprising:
a communication interface; and
a control system associated with the communication interface and adapted to:
register the virtual peer including a plurality of virtual peer members with the P2P network such that the virtual peer is established as a peer in the P2P network, wherein the sponsoring node operates as a communication end-point for the virtual peer in the P2P network, and each of the plurality of virtual peer members is communicatively coupled to the sponsoring node;
receive, by a device other than one of the plurality of virtual peer members, an incoming message on behalf of the virtual peer;
send the incoming message to at least one of the plurality of virtual peer members; and
effect by-passing of the sponsoring node for an outgoing message from the at least one of the virtual peer members to a desired recipient by:
providing virtual peer credentials to the at least one of the virtual peer members to be used when providing the outgoing message to the desired recipient,
wherein when the at least one of the plurality of virtual peer members provides the outgoing message to the desired recipient using the virtual peer credentials, the outgoing message appears to the desired recipient to have been provided by the virtual peer rather than the at least one of the plurality of virtual peer members.

26. The sponsoring node of claim 25 wherein the control system is further adapted to broadcast the incoming message to the plurality of virtual peer members.

27. The sponsoring node of claim 25 wherein the control system is further adapted to:
identify ones of the plurality of virtual peer members to receive the message; and
multi-cast the incoming message to the ones of the plurality of virtual peer members.

28. The sponsoring node of claim 25 wherein the control system is further adapted to:
identify one of the plurality of virtual peer members to receive the message; and
send the incoming message to the plurality of virtual peer members.

29. The sponsoring node of claim 25 wherein the control system is further adapted to:
identify one of the plurality of virtual peer members to receive the message; and
redirect the device to the one of the plurality of virtual peer members.

30. The sponsoring node of claim 25 wherein the control system is further adapted to:
receive an outgoing message from one of the plurality of virtual peer members;
process the outgoing message to convert the outgoing message to an outgoing message originating from the virtual peer; and
send the outgoing message originating from the virtual peer to a desired recipient.

* * * * *